US012132898B2

(12) United States Patent
Yang et al.

(10) Patent No.: US 12,132,898 B2
(45) Date of Patent: Oct. 29, 2024

(54) INTRA SUB-PARTITIONS RELATED INTRA CODING

(71) Applicant: VID SCALE, INC., Wilmington, DE (US)

(72) Inventors: Hua Yang, Plainsboro, NJ (US); Yuwen He, San Diego, CA (US); Wei Chen, San Diego, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 108 days.

(21) Appl. No.: 17/760,985

(22) PCT Filed: Sep. 17, 2020

(86) PCT No.: PCT/US2020/051230
§ 371 (c)(1),
(2) Date: Mar. 16, 2022

(87) PCT Pub. No.: WO2021/055574
PCT Pub. Date: Mar. 25, 2021

(65) Prior Publication Data
US 2022/0345701 A1    Oct. 27, 2022

Related U.S. Application Data

(60) Provisional application No. 62/901,497, filed on Sep. 17, 2019.

(51) Int. Cl.
*H04N 19/00* (2014.01)
*H04N 19/105* (2014.01)
(Continued)

(52) U.S. Cl.
CPC ......... *H04N 19/119* (2014.11); *H04N 19/105* (2014.11); *H04N 19/159* (2014.11); *H04N 19/176* (2014.11)

(58) Field of Classification Search
CPC .. H04N 19/119; H04N 19/105; H04N 19/159; H04N 19/176
See application file for complete search history.

(56) References Cited

U.S. PATENT DOCUMENTS

2020/0252608 A1* 8/2020 Ramasubramonian ...................... H04N 19/119
2020/0366895 A1* 11/2020 De Luxán Hernández ................ H04N 19/593

(Continued)

OTHER PUBLICATIONS

Albrecht et al., "Description of SDR, HDR, and 360° Video Coding Technology Proposal by Fraunhofer HHI", JVET-J0014-V4, Fraunhofer HHI, Joint Video Experts Team (JVET) of ITU-T SG 16 WP 3 and ISO/IEC JTC 1/SC 29/WG 11, 10th Meeting: San Diego, US, Apr. 10-20, 2018, 122 pages.

(Continued)

*Primary Examiner* — Zhihan Zhou
(74) *Attorney, Agent, or Firm* — Condo Roccia Koptiw LLP

(57) ABSTRACT

Systems, methods, and instrumentalities may be used for decoding and/or encoding a coding unit (CD), An intra-prediction mode for a CD may be determined. A split mode may be determined based on the intra-prediction mode, to generate a plurality of sub-partitions in the CU. A prediction for a first sub-partition of the plurality of sub-partitions in the CU may be based on a reference sample in a second sub-partition of the plurality of sub-partitions in the CU. The CU may be decoded and/or encoded, for example, based on the determined split mode.

18 Claims, 14 Drawing Sheets

(51) Int. Cl.
*H04N 19/119* (2014.01)
*H04N 19/159* (2014.01)
*H04N 19/176* (2014.01)

(56) References Cited

U.S. PATENT DOCUMENTS

2021/0084309 A1* 3/2021 Zhao .................... H04N 19/176
2021/0409765 A1* 12/2021 De Luxán Hernández ................
                                                        H04N 19/172

OTHER PUBLICATIONS

Bross et al., "High Efficiency Video Coding (HEVC) Text Specification Draft 10 (For FDIS & Consent)", JCTVC-L1003_V1, Editor, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 321 pages.

Bross et al., "Versatile Video Coding (Draft 6)", JVET-O2001-VD, Editors, Joint Video Experts Team (JVET) of ITU-T SG 16 WP 3 and ISO/IEC JTC 1/SC 29/WG 11, 15th Meeting: Gothenburg, SE, Jul. 3-12, 2019, 456 pages.

Chen et al., "Algorithm Description for Versatile Video Coding and Test Model 6 (VTM 6)", JVET-O2002-V2, Editors, Joint Video Experts Team (JVET) of ITU-T SG 16 WP 3 and ISO/IEC JTC 1/SC 29/WG 11, 15th Meeting: Gothenburg, SE, Jul. 3-12, 2019, 87 pages.

Choi et al., "Non-CE3: Simplified Intra Mode Candidates for ISP", JVET-N0230-V3, LG Electronics Inc., Joint Video Experts Team (JVET) of ITU-T SG 16 WP 3 and ISO/IEC JTC 1/SC 29/WG 11, 14th Meeting: Geneva, CH, Mar. 19-27, 2019, 5 pages.

Heo et al., "Non-CE3: Restriction on WAIP for MRL and ISP Intra Prediction", JVET-O0356-V2, LG Electronics Inc., Joint Video Experts Team (JVET) of ITU-T SG 16 WP 3 and ISO/IEC JTC 1/SC 29/WG 11, 15th Meeting: Gothenburg, SE, Jul. 3-12, 2019, 4 pages.

Hernandez et al., "CE3: Line-Based Intra Coding Mode (Tests 2.1.1 and 2.1.2)", JVET-L0076-V2, Fraunhofer HHI, Joint Video Experts Team (JVET) of ITU-T SG 16 WP 3 and ISO/IEC JTC 1/SC 29/WG 11, 12th Meeting: Macao, CN, Oct. 3-12, 2018, pp. 1-9.

ITU-T, "Advanced Video Coding for Generic Audiovisual Services", ITU-T Recommendation H.264 and ISO/IEC/MPEG-4 Part 10, Nov. 2007.

Peng et al., "Line-Based Image Coding Using Adaptive Prediction Filters", IEEE International Symposium on Circuits and Systems, ISCAS 2010, Paris, France, May 2010, pp. 4221-4224.

Ramasubramonian et al., "CE3-1.7: On 1xN and 2xN Subblocks of ISP with Vertical Intra Mode Restriction for 4xN Vertically Split ISP-Coded Blocks", JVET-O0107-V1, Qualcomm Technologies Inc., Joint Video Experts Team (JVET) of ITU-T SG 16 WP 3 and ISO/IEC JTC 1/SC 29/WG 11, 15th Meeting: Gothenburg, SE, Jul. 3-12, 2019, 4 pages.

Segall et al., "Joint Call for Proposals on Video Compression with Capability Beyond HEVC", JVET-H1002 (V6), Editors, Joint Video Exploration Team (JVET) of ITU-T SG 16 WP 3 and ISO/IEC JTC 1/SC 29/WG 11, 8th Meeting: Macao, CN, Oct. 18-24, 2017, 27 pages.

SMPTE, "VC-1 Compressed Video Bitstream Format and Decoding Process", SMPTE 421M, Apr. 2006, 493 pages.

Sullivan et al., "Overview of the High Efficiency Video Coding (HEVC) Standard", IEEE Transactions on Circuits and Systems for Video Technology, vol. 22, No. 12, Dec. 2012, pp. 1649-1668.

"VTM-6.0 Reference Software", Available at <https://vcgit.hhi.fraunhofer.de/jvet/VVCSoftware_VTM/tags/VTM-6.0>, pp. 1-2.

Bossen et al., "JVET common test conditions and software reference configurations for SDR video", JVET-N1010-v1, Joint Video Experts Team (JVET) of ITU-T SG 16 WP 3 and ISO/IEC JTC 1/SC 29/WG 11, 14th Meeting: Geneva, CH, Mar. 19-27, 2019, 6 pages.

* cited by examiner (a) Horizontal ISP split for intra mode referring to top boundary reference samples (b) Vertical ISP split for intra mode referring to left boundary reference samples

INTRA SUB-PARTITIONS RELATED INTRA CODING

CROSS-REFERENCE TO RELATED APPLICATION

This application is the National Stage Entry under 35 U.S.C. § 371 of Patent Cooperation Treaty Application No. PCT/US2020/051230, filed Sep. 17, 2020, which claims priority to U.S. Ser. No. 62/901,497, filed Sep. 17, 2019, the entire disclosure of which is incorporated herein by reference.

BACKGROUND

Video coding systems may be used to compress digital video signals, for example, to reduce the storage and/or transmission bandwidth associated with such signals. Video coding systems may include block-based, wavelet-based, and/or object-based systems. A block-based hybrid video coding system may be deployed.

SUMMARY

Systems, methods, and instrumentalities are described for decoding and/or encoding a coding unit (CU) using a split mode that is determined based on an intra-prediction mode for the CU.

One or more processors may be configured to determine an intra-prediction mode for a CU. The one or more processors may be configured to determine a split mode based on the intra-prediction mode to generate a plurality of sub-partitions in the CU, wherein a prediction for a first sub-partition of the plurality of sub-partitions in the CU may be based on a reference sample in a second sub-partition of the plurality of sub-partitions in the CU. The one or more processors may be configured to decode the CU based on the determined split mode.

One or more processors may be configured to determine an intra-prediction mode for a CU. The one or more processors may be configured to determine a split mode based on the intra-prediction mode to generate a plurality of sub-partitions in the CU, wherein a prediction for a first sub-partition of the plurality of sub-partitions in the CU is based on a reference sample in a second sub-partition of the plurality of sub-partitions in the CU. The one or more processors may be configured to encode the CU based on the determined split mode.

A device may comprise an apparatus as described and at least one of (i) an antenna configured to receive a signal, the signal including data representative of an image, (ii) a band limiter configured to limit the received signal to a band of frequencies that includes the data representative of the image, or (iii) a display configured to display the image. Nonlimiting examples of such device may include a TV, a cell phone, a tablet, or a set-top box (STB). An apparatus may comprise an accessing unit configured to access data (for example, including a residual) generated based on the determined split mode for the CU according to the apparatus as described in any combination of the above, and a transmitter configured to transmit the data (for example, including the residual).

A method may include determining an intra-prediction mode for a CU. The method may include determining a split mode based on the intra-prediction mode to generate a plurality of sub-partitions in the CU, wherein a prediction for a first sub-partition of the plurality of sub-partitions in the CU is based on a reference sample in a second sub-partition of the plurality of sub-partitions in the CU. The method may include decoding the CU based on the determined split mode.

A method may include determining an intra-prediction mode for a CU. The method may include determining a split mode based on the intra-prediction mode to generate a plurality of sub-partitions in the CU, wherein a prediction for a first sub-partition of the plurality of sub-partitions in the CU is based on a reference sample in a second sub-partition of the plurality of sub-partitions in the CU. The method may include encoding the CU based on the determined split mode.

Devices may employ the methods described, and such devices may include at least one of (i) an antenna configured to receive a signal, the signal including data representative of an image, (ii) a band limiter configured to limit the received signal to a band of frequencies that includes the data representative of the image, or (iii) a display configured to display the image. Nonlimiting examples of such devices include a TV, a cell phone, a tablet, or a set-top box (STB).

Apparatuses that employ the methods, and such apparatuses may comprise an accessing unit configured to access data (for example, including a residual) generated based on the determined split mode for the CU, and a transmitter configured to transmit the data (for example, including the residual).

Non-transitory computer readable mediums may contain data content generated according to any of the methods described. Non-transitory computer readable mediums may cause one or more processors to perform any of the methods described.

Computer program products may comprise instructions for performing any of the methods described when executed by one or more processors.

Signals may comprise a residual generated based on the determined split mode for the CU according to any of the methods described.

Methods may comprise accessing data including a residual that is generated based on the determined split mode for the CU according to any of the methods described and transmitting the data including the residual.

DETAILED DESCRIPTION

Figure 1A:
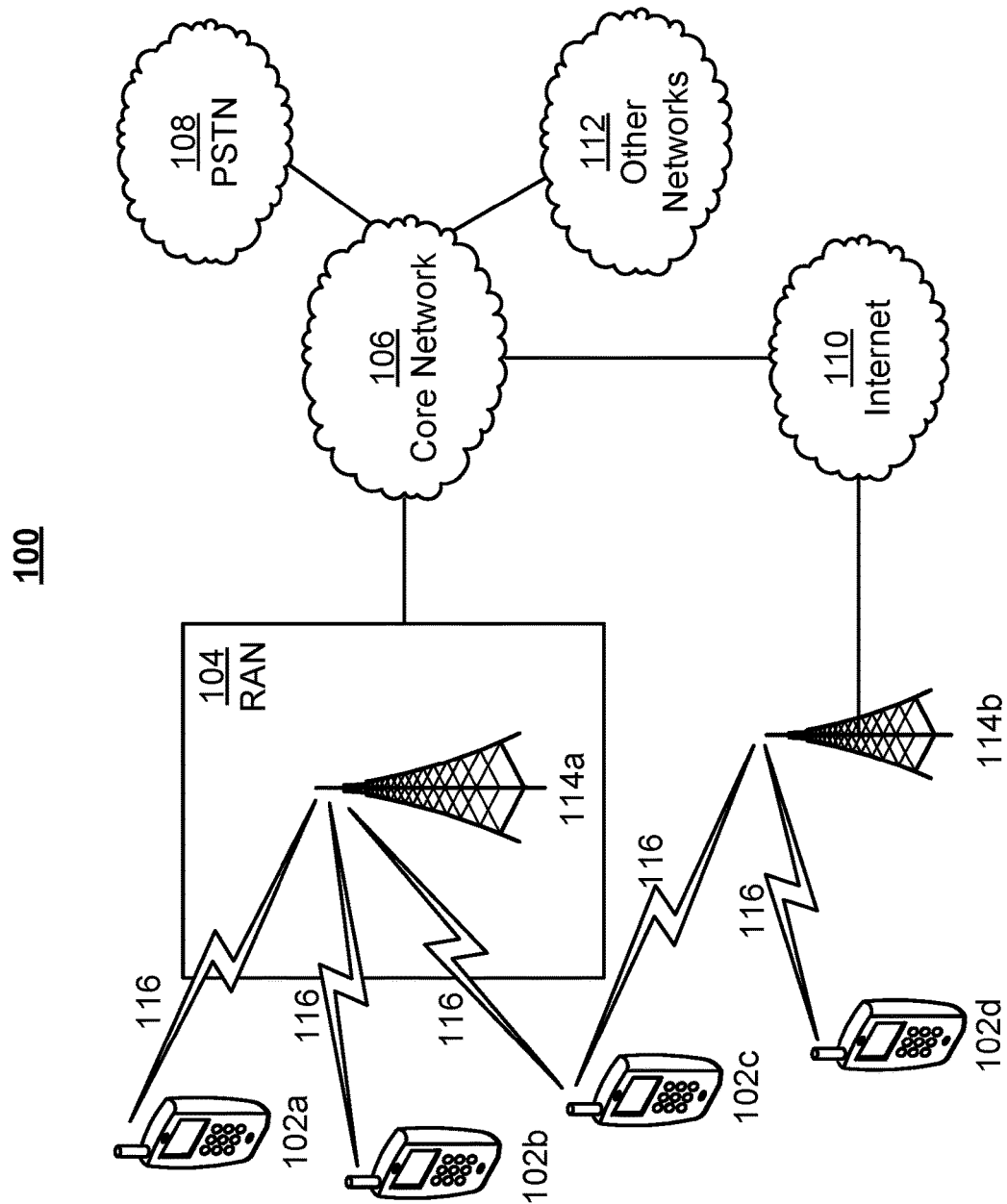
FIG. 1A is a system diagram illustrating an example communications system.

FIG. 1A is a diagram illustrating an example communications system 100 in which one or more disclosed examples may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed examples may contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an example, the base station 114a may include three transceivers, i.e., one for each sector of the cell. In an example, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an example, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an example, the base station 114a and the WTRUs 102a, 102b, 102c may implement a radio technology such as NR Radio Access, which may establish the air interface 116 using New Radio (NR).

In an example, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In examples, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an example, the base station 114b and the WTRUs 102c, 102d may implement a radio technology such as IEEE 802.11 to establish a wireless local area network (WLAN). In an example, the base station 114b and the WTRUs 102c, 102d may implement a radio technology such as IEEE 802.15 to establish a wireless personal area network (WPAN). In an example, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
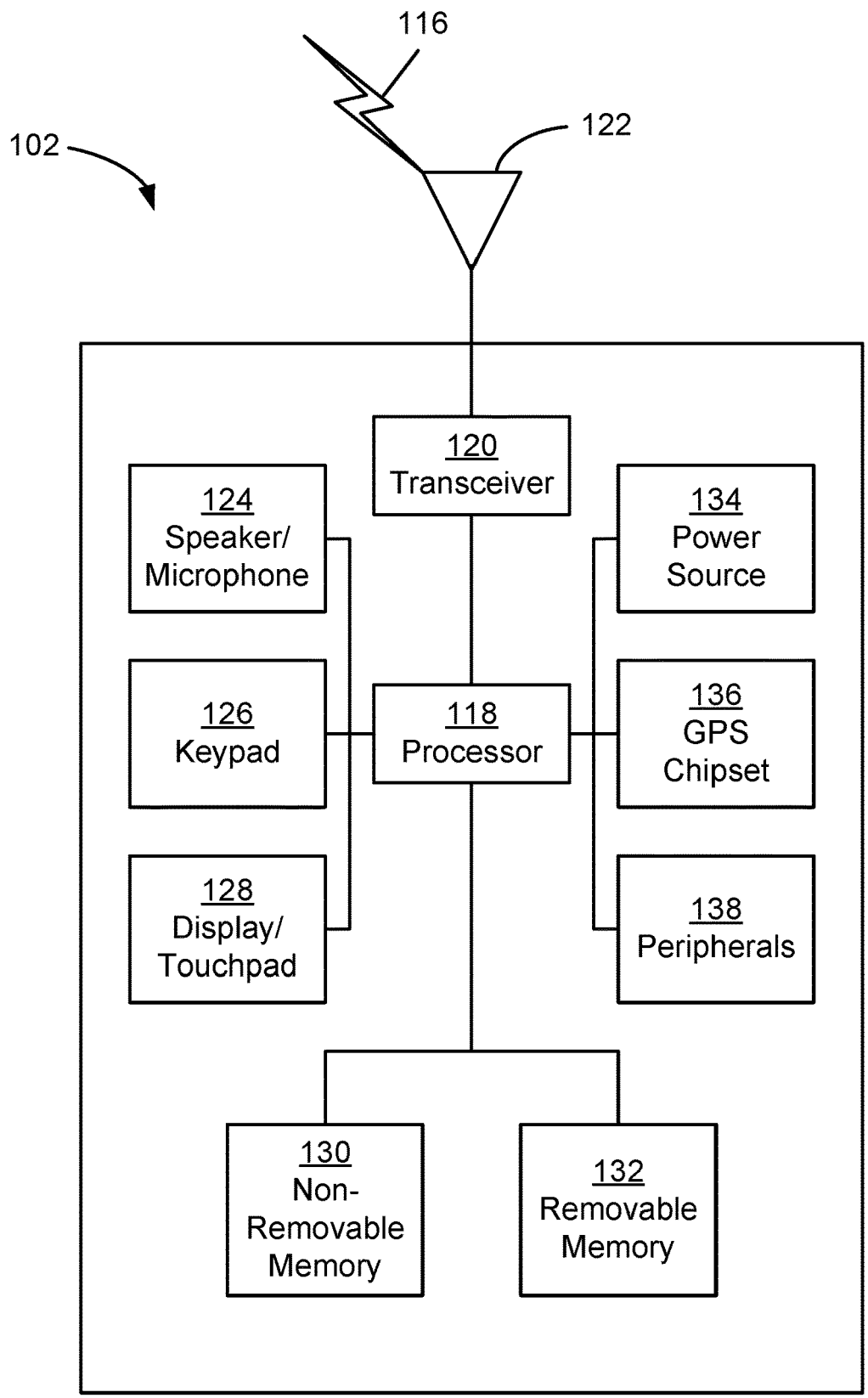
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in an example, the transmit/receive element 122 may be an antenna configured to transmit and/or receive RF signals. In an example, the transmit/receive element 122 may be an emitter/detector configured to transmit and/or receive IR, UV, or visible light signals, for example. In an example, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in an example, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In examples, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NIMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an example, the WRTU 102 may include a half-duplex radio for which transmission and reception of some or all of the signals (e.g., associated with particular subframes for either the UL (e.g., for transmission) or the downlink (e.g., for reception)).

Figure 1C:
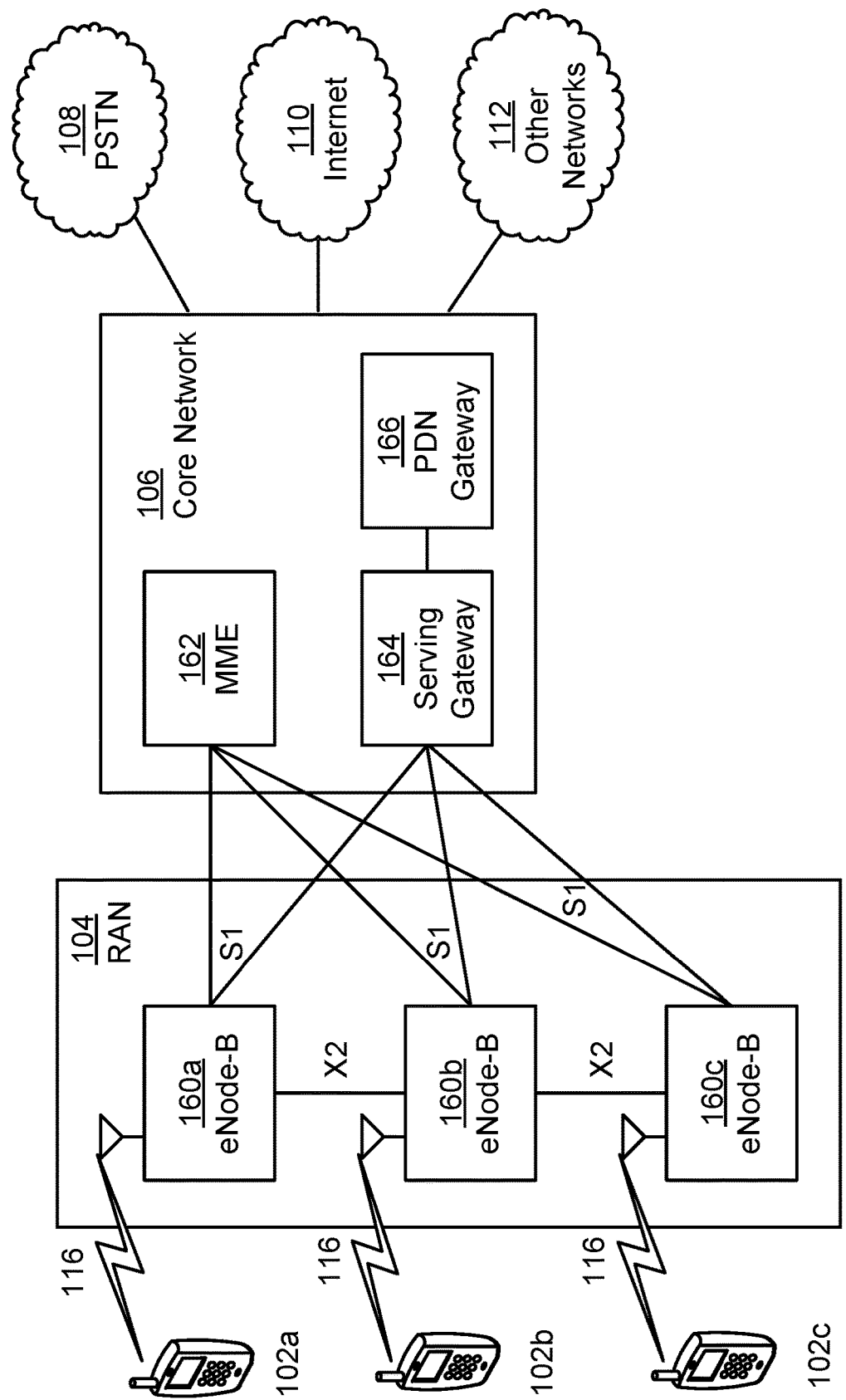
FIG. 1C is a system diagram illustrating an example radio access network (RAN) and an example core network (CN) that may be used within the communications system illustrated in FIG. 1A.

FIG. 1C is a system diagram illustrating an example RAN 104 and the CN 106. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs. The eNode-Bs 160a, 160b, 160c may each include one or more transceivers for communicating with the WTRUs 102a, 102b, 102c over the air interface 116. In an example, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

Figure 10:
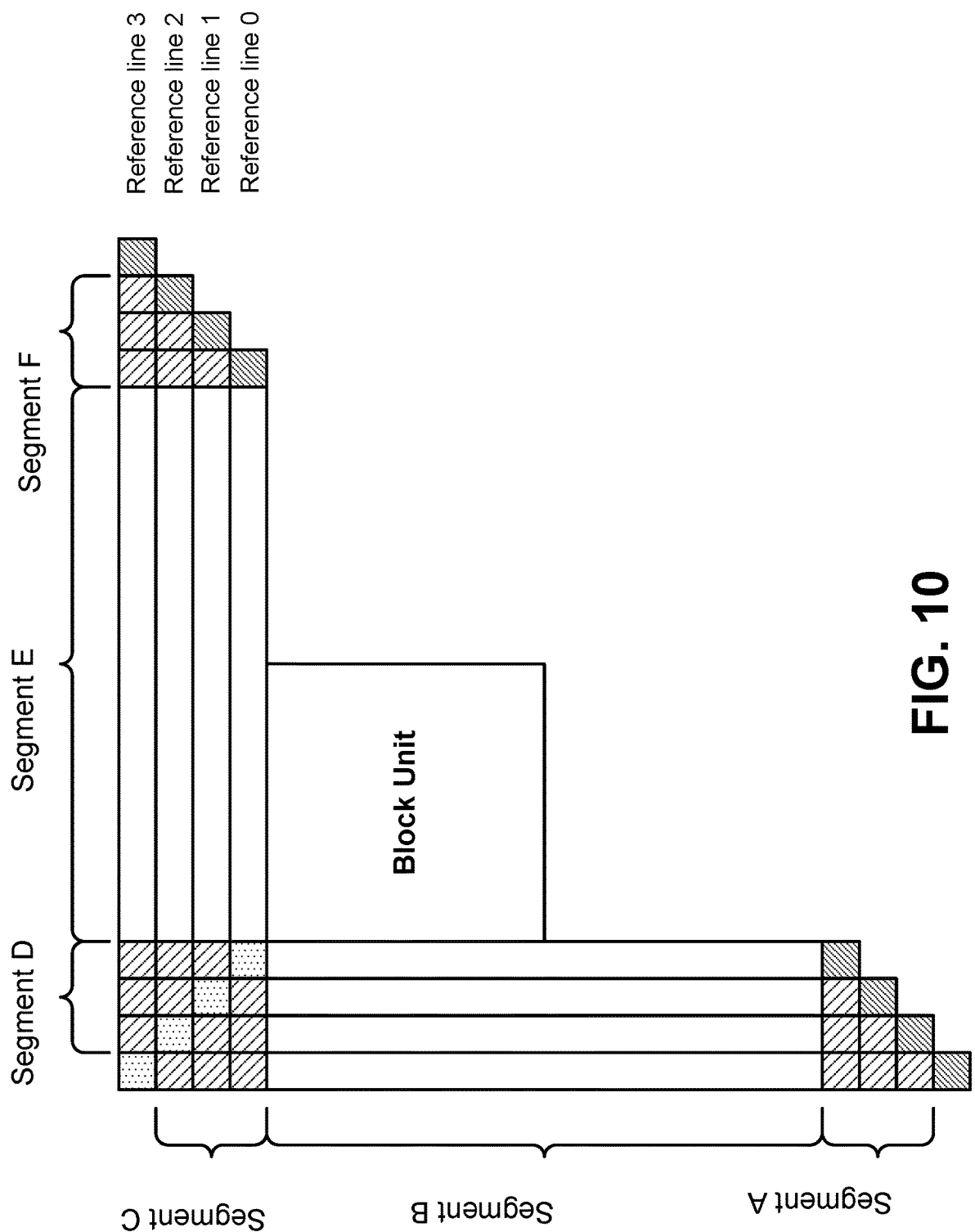
FIG. 10 illustrates an example of multiple reference lines (MRL) for intra prediction.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain examples such a terminal may use (e.g., temporarily or permanently) wired communication interfaces with the communication network.

In examples, the other network 112 may be a WLAN.

A WLAN in Infrastructure Basic Service Set (BSS) mode may have an Access Point (AP) for the BSS and one or more stations (STAs) associated with the AR The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In examples, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In examples, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to an example, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
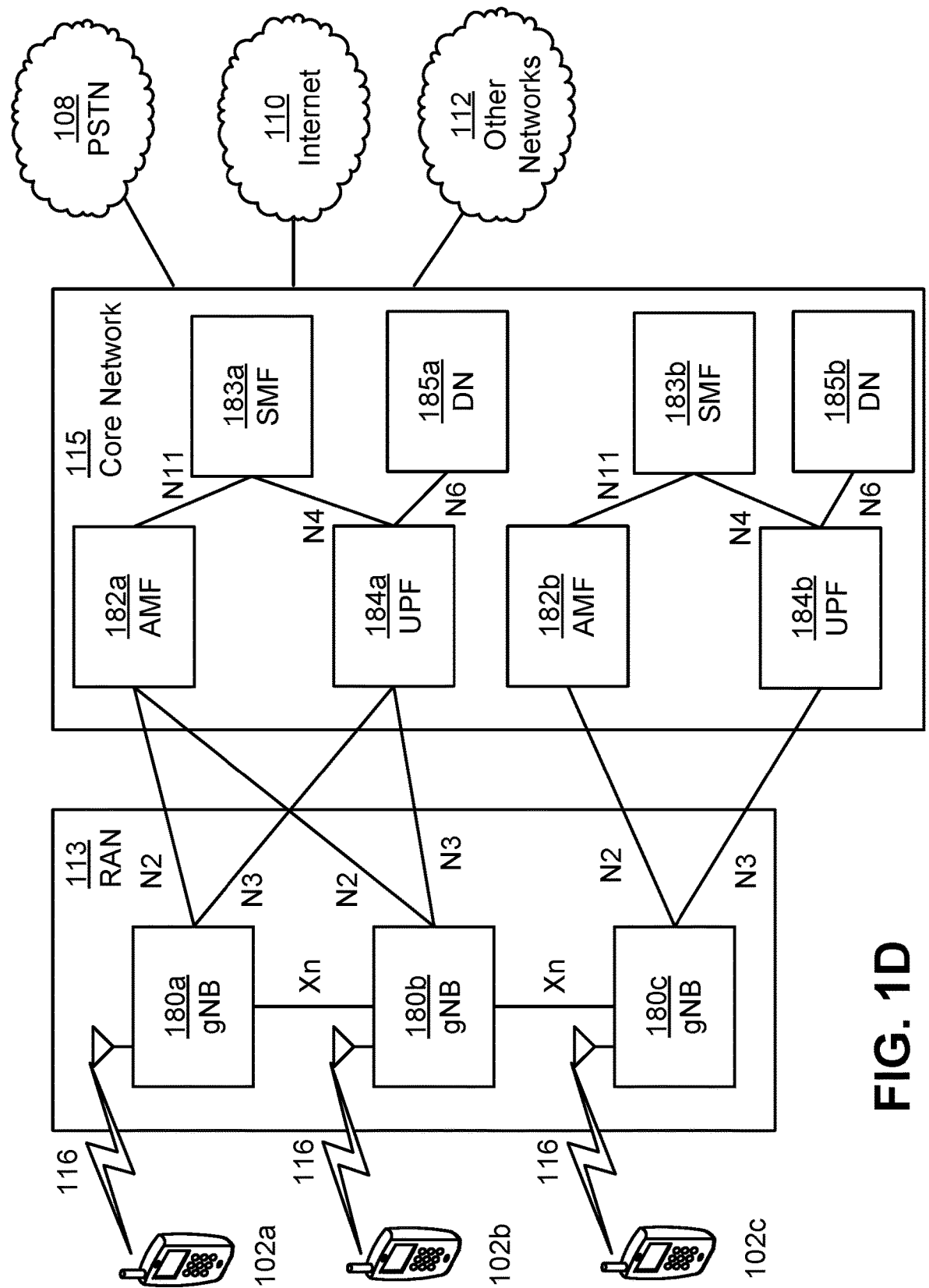
FIG. 1D is a system diagram illustrating a further example RAN and a further example CN that may be used within the communications system illustrated in FIG. 1A.

FIG. 1D is a system diagram illustrating an example RAN 113 and the CN 115. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs. The gNBs 180a, 180b, 180c may each include one or more transceivers for communicating with the WTRUs 102a, 102b, 102c over the air interface 116. In an example, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a, In an example, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an example, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like, Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an example, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

This application describes a variety of aspects, including tools, features, examples, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects may be combined and interchanged to provide further aspects. Moreover, the aspects may be combined and interchanged with aspects described in earlier filings as well.

The aspects described and contemplated in this application may be implemented in many different forms. FIGS. 5-12 described herein may provide some examples, but other examples are contemplated. The discussion of FIGS. 5-12 does not limit the breadth of the implementations. At least one of the aspects generally relates to video encoding and decoding, and at least one other aspect generally relates to transmitting a bitstream generated or encoded. These and other aspects may be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various examples to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 2:
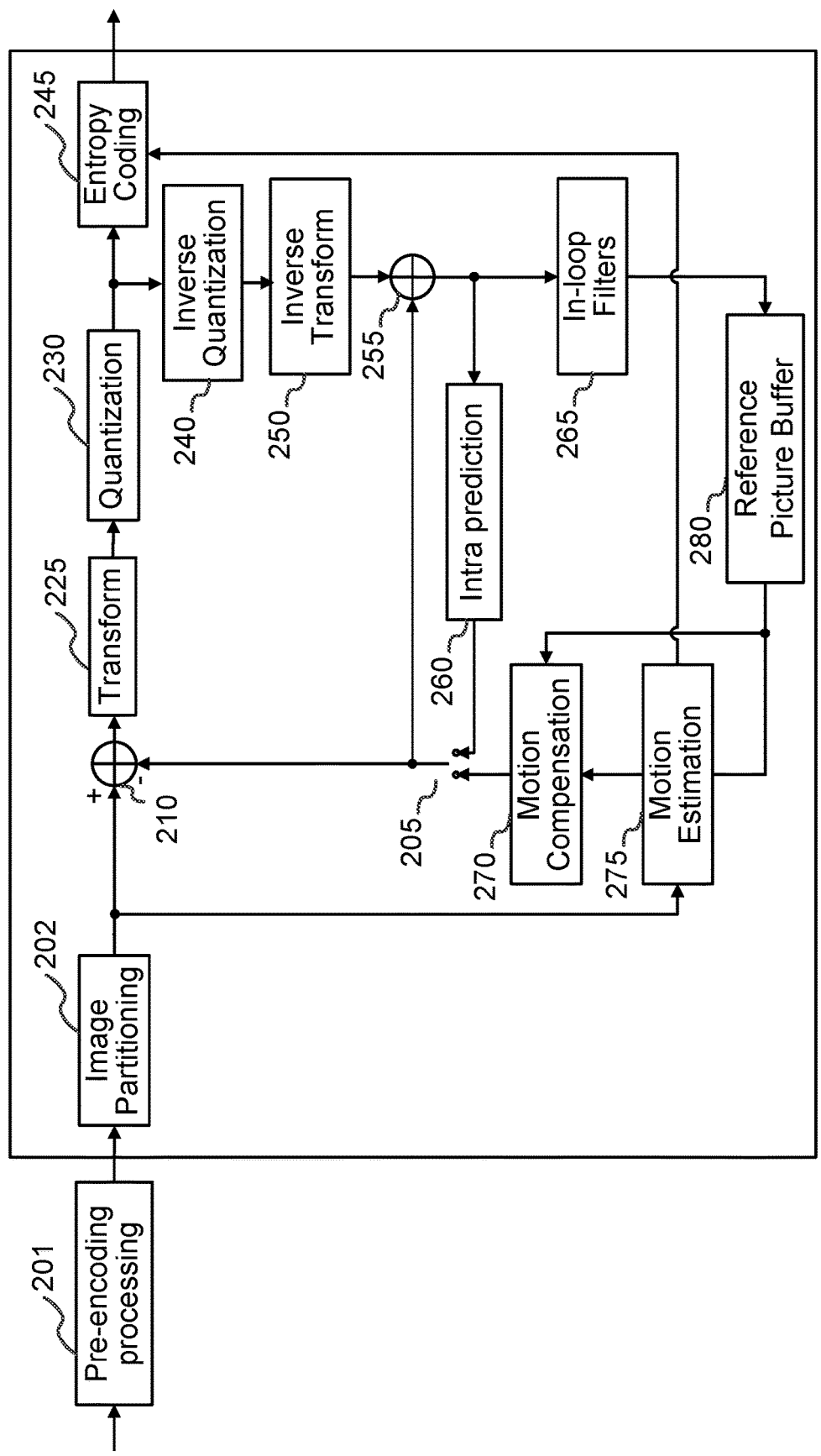
FIG. 2 is a diagram showing an example video encoder.
Figure 3:
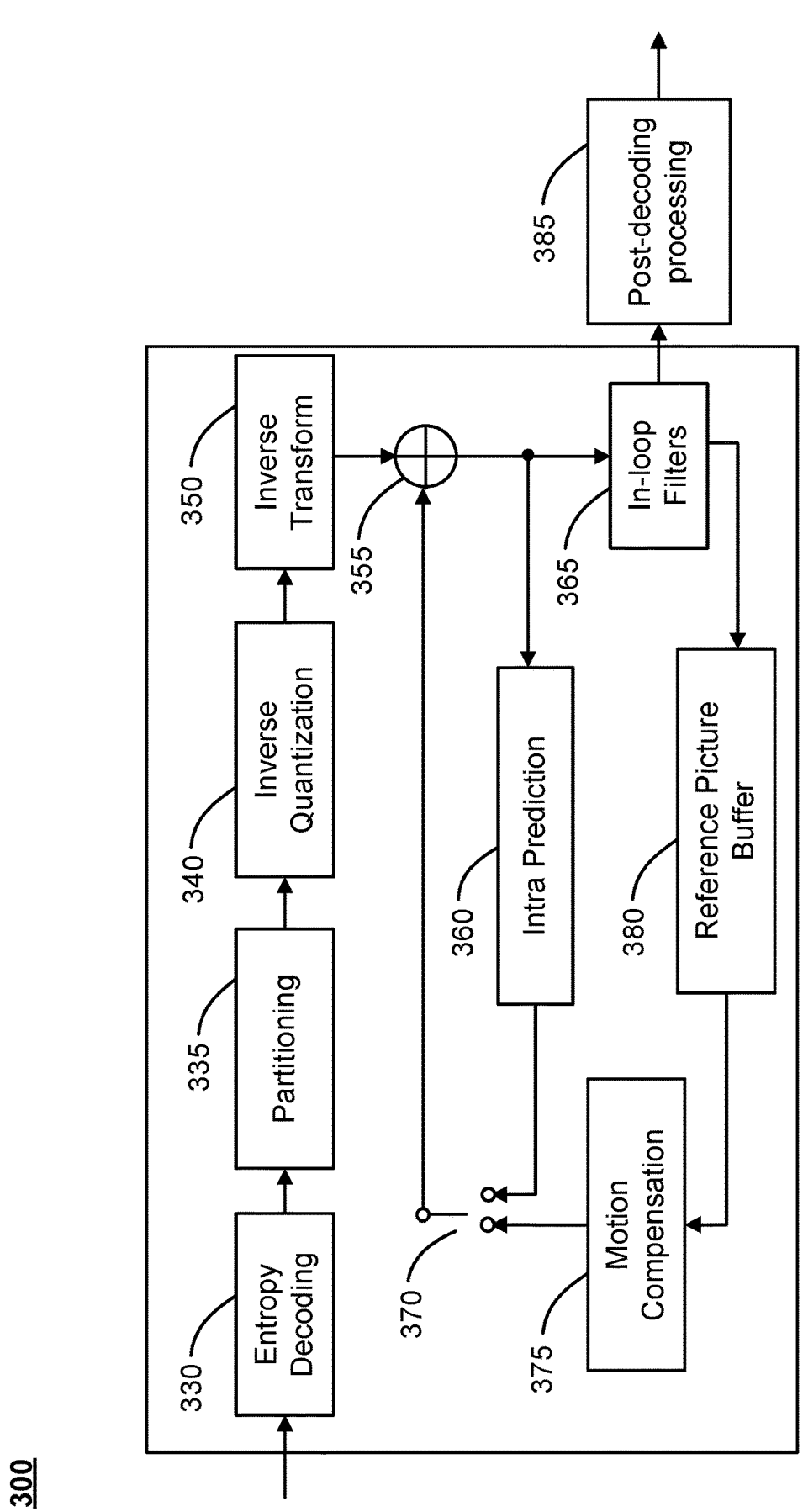
FIG. 3 is a diagram showing an example of a video decoder.

Various methods and other aspects described in this application may be used to modify modules, for example, decoding modules, of a video encoder 200 and decoder 300 as shown in FIG. 2 and FIG. 3. Moreover, the subject matter disclosed herein may be applied, for example, to any type, format or version of video coding, whether described in a standard or a recommendation, whether pre-existing or future-developed, and extensions of any such standards and recommendations. Unless indicated otherwise, or technically precluded, the aspects described in this application may be used individually or in combination.

Various numeric values are used in examples described the present application, such as angles, indices, etc. These and other specific values are for purposes of describing examples and the aspects described are not limited to these specific values.

FIG. 2 is a diagram showing an example video encoder. Variations of example encoder 200 are contemplated, but the encoder 200 is described below for purposes of clarity without describing all expected variations.

Before being encoded, the video sequence may go through pre-encoding processing (201), for example, applying a color transform to the input color picture (for example, conversion from RGB 4:4:4 to YCbCr 4:2:0), or performing a remapping of the input picture components in order to get a signal distribution more resilient to compression (for instance using a histogram equalization of one of the color components). Metadata may be associated with the pre-processing, and attached to the bitstream.

In the encoder 200, a picture is encoded by the encoder elements as described below. The picture to be encoded is partitioned (202) and processed in units of, for example, coding units (CUs). Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

FIG. 3 is a diagram showing an example of a video decoder. In example decoder 300, a bitstream is decoded by the decoder elements as described below. Video decoder 300 generally performs a decoding pass reciprocal to the encoding pass as described in FIG. 2. The encoder 200 may also generally perform video decoding as part of encoding video data. For example, the encoder 200 may perform one or more of the video decoding steps presented herein. The encoder reconstructs the decoded images, for example, to maintain synchronization with the decoder with respect to one or more of the following: reference pictures, entropy coding contexts, and other decoder-relevant state variables.

In particular, the input of the decoder includes a video bitstream, which may be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (for example, conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream. In an example, the decoded images (for example, after application of the in-loop filters (365) and/or after post-decoding processing (385), if post-decoding processing is used) may be sent to a display device for rendering to a user.

Figure 4:
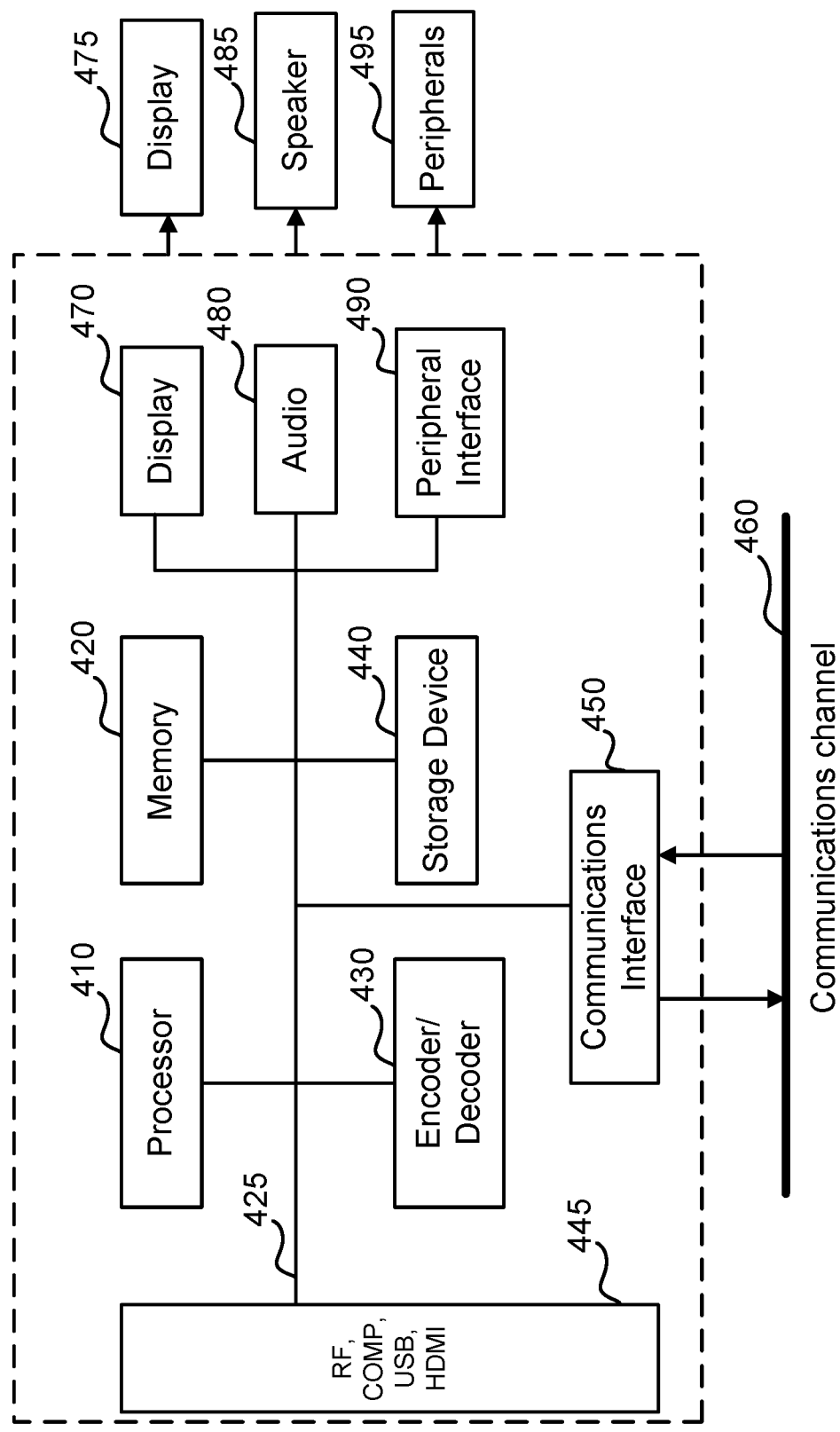
FIG. 4 illustrates an example of a system in which various aspects and examples may be implemented.

FIG. 4 is a diagram showing an example of a system in which various aspects and examples described herein may be implemented. System 400 may be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 400, singly or in combination, may be embodied in a single integrated circuit (IC), multiple ICs, and/or discrete components. For example, in at least one example, the processing and encoder/decoder elements of system 400 are distributed across multiple ICs and/or discrete components. In various examples, the system 400 is communicatively coupled to one or more other systems, or other electronic devices, via, for example, a communications bus or through dedicated input and/or output ports. In various examples, the system 400 is configured to implement one or more of the aspects described in this document.

The system 400 includes at least one processor 410 configured to execute instructions loaded therein for implementing, for example, the various aspects described in this document. Processor 410 can include embedded memory, input output interface, and various other circuitries as known in the art. The system 400 includes at least one memory 420 (for example, a volatile memory device, and/or a non-volatile memory device). System 400 includes a storage device 440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 440 can include an internal storage device, an attached storage device (including detachable and non-detachable storage devices), and/or a network accessible storage device, as non-limiting examples.

System 400 includes an encoder/decoder module 430 configured, for example, to process data to provide an encoded video or decoded video, and the encoder/decoder module 430 can include its own processor and memory. The encoder/decoder module 430 represents module(s) that may be included in a device to perform the encoding and/or decoding functions. As is known, a device can include one or both of the encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in this document may be stored in storage device 440 and subsequently loaded onto memory 420 for execution by processor 410. In accordance with various examples, one or more of processor 410, memory 420, storage device 440, and encoder/decoder module 430 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some examples, memory inside of the processor 410 and/or the encoder/decoder module 430 is used to store instructions and to provide working memory for processing that is needed during encoding or decoding. In other examples, however, a memory external to the processing device (for example, the processing device may be either the processor 410 or the encoder/decoder module 430) is used for one or more of these functions. The external memory may be the memory 420 and/or the storage device 440, for example, a dynamic volatile memory and/or a non-volatile flash memory. In several examples, an external non-volatile flash memory is used to store the operating system of, for example, a television. In at least one example, a fast external dynamic volatile memory such as a RAM is used as working memory for video encoding and decoding operations. Examples of decoding and encoding operations include MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by NET, the Joint Video Experts Team).

The input to the elements of system 400 may be provided through various input devices as indicated in block 445. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 4, include composite video.

In various examples, the input devices of block 445 have associated respective input processing elements as known in the art. For example, the RF portion may be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which may be referred to as a channel in certain examples, (iv) demodulating the downconverted and band-limited signal, (v) performing error correction, and (vi) demultiplexing to select the desired stream of data packets. The RF portion of various examples includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box example, the RF portion and its associated input processing element receives an RF signal transmitted over a wired (for example, cable) medium, and performs frequency selection by filtering, downconverting, and filtering again to a desired frequency band. Various examples rearrange the order of the above-described (and other) elements, remove some of these elements, and/or add other elements performing similar or different functions. Adding elements can include inserting elements in between existing elements, such as, for example, inserting amplifiers and an analog-to-digital converter. In various examples, the RF portion includes an antenna.

Additionally, the USB and/or HDMI terminals can include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream is provided to various processing elements, including, for example, processor 410, and encoder/decoder 430 operating in combination with the memory and storage elements to process the datastream as necessary for presentation on an output device.

Various elements of system 400 may be provided within an integrated housing. Within the integrated housing, the various elements may be interconnected and transmit data therebetween using suitable connection arrangement 425, for example, an internal bus as known in the art, including the Inter-IC (I2C) bus, wiring, and printed circuit boards.

The system 400 includes communication interface 450 that enables communication with other devices via communication channel 460. The communication interface 450 can include, but is not limited to, a transceiver configured to transmit and to receive data over communication channel 460. The communication interface 450 can include, but is not limited to, a modem or network card and the communication channel 460 may be implemented, for example, within a wired and/or a wireless medium.

Data is streamed, or otherwise provided, to the system 400, in various examples, using a wireless network such as a Wi-Fi network, for example, IEEE 802.11 (IEEE refers to the Institute of Electrical and Electronics Engineers). The Wi-Fi signal of these examples is received over the communications channel 460 and the communications interface 450 which are adapted for Wi-Fi communications. The communications channel 460 of these examples is typically connected to an access point or router that provides access to external networks including the Internet for allowing streaming applications and other over-the-top communications. Other examples provide streamed data to the system 400 using a set-top box that delivers the data over the HDMI connection of the input block 445. Still other examples provide streamed data to the system 400 using the RF connection of the input block 445. As indicated above, various examples provide data in a non-streaming manner. Additionally, various examples use wireless networks other than Wi-Fi, for example, a cellular network or a Bluetooth® network.

The system 400 can provide an output signal to various output devices, including a display 475, speakers 485, and other peripheral devices 495. The display 475 of various examples includes one or more of, for example, a touch-screen display, an organic light-emitting diode (OLED) display, a curved display, and/or a foldable display. The display 475 may be for a television, a tablet, a laptop, a cell phone (mobile phone), or other device. The display 475 can also be integrated with other components (for example, as in a smart phone), or separate (for example, an external monitor for a laptop). The other peripheral devices 495 include, in various examples, one or more of a stand-alone digital video disc (or digital versatile disc) (DVD, for both terms), a disk player, a stereo system, and/or a lighting system. Various examples use one or more peripheral devices 495 that provide a function based on the output of the system 400. For example, a disk player performs the function of playing the output of the system 400.

In various examples, control signals are communicated between the system 400 and the display 475, speakers 485, or other peripheral devices 495 using signaling such as AV.Link, Consumer Electronics Control (CEC), or other communications protocols that enable device-to-device control with or without user intervention. The output devices may be communicatively coupled to system 400 via dedicated connections through respective interfaces 470, 480, and 490. Alternatively, the output devices may be connected to system 400 using the communications channel 460 via the communications interface 450. The display 475 and speakers 485 may be integrated in a single unit with the other components of system 400 in an electronic device such as, for example, a television. In various examples, the display interface 470 includes a display driver, such as, for example, a timing controller (T Con) chip.

The display 475 and speakers 485 can alternatively be separate from one or more of the other components, for example, if the RF portion of input 445 is part of a separate set-top box. In various examples in which the display 475 and speakers 485 are external components, the output signal may be provided via dedicated output connections, including, for example, HDMI ports, USB ports, or COMP outputs.

The examples may be carried out by computer software implemented by the processor 410 or by hardware, or by a combination of hardware and software. As a non-limiting example, the examples may be implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various examples, such processes include one or more of the processes typically performed by a decoder, for example, entropy decoding, inverse quantization, inverse transformation, and differential decoding. In various examples, such processes also, or alternatively, include processes performed by a decoder of various implementations described in this application, for example, determining a split mode based on the intra-prediction mode to generate a plurality of sub-partitions in the CU, predicting a first sub-partition of the plurality of sub-partitions in the CU, for example, based on a reference sample in a second sub-partition of the plurality of sub-partitions in the CU, etc.

As further examples, in one example "decoding" refers only to entropy decoding, in another example "decoding" refers only to differential decoding, and in another example "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various examples, such processes include one or more of the processes typically performed by an encoder, for example, partitioning, differential encoding, transformation, quantization, and entropy encoding. In various examples, such processes also, or alternatively, include processes performed by an encoder of various implementations described in this application, for example, determining a split mode based on the intra-prediction mode to generate a plurality of sub-partitions in the CU, predicting a first sub-partition of the plurality of sub-partitions in the CU, for example, based on a reference sample in a second sub-partition of the plurality of sub-partitions in the CU, etc.

As further examples, in one example "encoding" refers only to entropy encoding, in another example "encoding" refers only to differential encoding, and in another example "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that syntax elements as used herein, for example, coding unit syntax on luma intra prediction mode, intra_subpartitions_split_flag[x0][ y0], predIntraMode, IntraSubPartitionsSplitType, intra_subpartitions_mode_flag[x0][y0], etc., are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various examples refer to decoding. Content adaptive transform may be applied. In particular an apparatus may receive a video bitstream representing content. The video bitstream may include quantized transform coefficients for one or more blocks. A precision factor (for example, a shift) may be obtained (for example, determined or signaled). The precision factor may have one or more precision values to be used in an encoder or decoder operation, or one or more shift values to be used in a quantization or dequantization process. The precision factor may be associated with a block for performing at least one decoding function on the block. In an example, the precision factor may be based on a magnitude of the transform coefficients for the block. The precision factor may reduce the largest magnitude transform coefficient to fit within 16-bits.

The implementations and aspects described herein may be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus may be implemented in, for example, appropriate hardware, software, and firmware. The methods may be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one example" or "an example" or "one implementation" or "an implementation", as well as other variations thereof, means that a particular feature, structure, characteristic, and so forth described in connection with the example is included in at least one example. Thus, the appearances of the phrase "in one example" or "in an example" or "in one implementation" or "in an implementation", as well any other variations, appearing in various places throughout this application are not necessarily all referring to the same example.

Additionally, this application may refer to "determining" various pieces of information. Determining the information can include one or more of, for example, estimating the information, calculating the information, predicting the information, or retrieving the information from memory. Obtaining may include receiving, retrieving, constructing, generating, and/or determining.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. Encoder signals may include, for example, an indication of an intra-prediction mode, an indication of enabled ISP, etc. In this way, in an example the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various examples. It is to be appreciated that signaling may be accomplished in a variety of ways. For example, one or more syntax elements, flags, and so forth are used to signal information to a corresponding decoder in various examples. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information can include, for example, instructions for performing a method, or data produced by one of the described implementations. For example, a signal may be formatted to carry the bitstream of a described example. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of examples are described herein. Features of examples may be provided alone or in any combination, across various claim categories and types. Further, examples may include one or more of the features, devices, or aspects described herein, alone or in any combination, across various claim categories and types. For example, features described herein may be implemented in a bitstream or signal that includes information generated as described herein. The information may allow a decoder to decode a bitstream, the encoder, bitstream, and/or decoder according to any of the embodiments described. For example, features described herein may be implemented by creating and/or transmitting and/or receiving and/or decoding a bitstream or signal. For example, features described herein may be implemented a method, process, apparatus, medium storing instructions, medium storing data, or signal. For example, features described herein may be implemented by a TV, set-top box, cell phone, tablet, or other electronic device that performs decoding. The TV, set-top box, cell phone, tablet, or other electronic device may display (for example, using a monitor, screen, or other type of display) a resulting image (for example, an image from residual reconstruction of the video bitstream). The TV, set-top box, cell phone, tablet, or other electronic device may receive a signal including an encoded image and perform decoding.

Various coding structures may be used. Flexible multi-type tree block partitioning (for example, quad-tree, binary tree, and/or ternary tree partitioning) may be performed. Infra prediction may be performed. For example, one or more (for example, 65) angular intra prediction directions, including wide angle prediction, chroma component linear model (CCLM), and/or matrix-based intra prediction (MP) may be used. Inter prediction may be performed. One or more of the prediction directions may be predetermined. For example, affine motion model, sub-block temporal motion vector prediction (SbTMVP), adaptive motion vector precision, decoder-side motion vector refinement (DMVR), tri-angular partitions, combined intra and inter prediction (CUP), merge mode with motion vector difference (MMVD), bi-directional optical flow (BDOF), pixel refinement optical flow (PROF), and/or bi-predictive weighted averaging (BPWA) may be used. Transform, quantization and coefficients coding may be performed. For example, multiple primary transform selection with DCT2, DST7 and DCT8, secondary transform coding of low frequency non-separable transform (LFNST), dependent quantization with max QP increased from 51 to 63, and/or a modified transform coefficient coding may be used. An in-loop filter (for example, a generalized adaptive loop filter (CALF)) may be used. Screen content coding (for example, intra block copy (IBC) and/or palette mode (PLT) for 4:4:4 content) may be performed, 360-degree video coding (for example, horizontal wrap-around motion compensation) may be performed.

Intra sub-partition (ISP) mode may be used to code (for example, splitting) a CU into multiple sub-partitions.

ISP may be a way of sequentially coding a CU (for example, an intra mode CU) into multiple sub-partitions. A CU may be partitioned into multiple sub-partitions, for example, based on a split mode. A sub-partition may be a portion of the CU. Some or all the sub-partitions may share the same intra mode of the CU (for example, the entire CU). Coding overhead from signaling intra mode variable(s) for sub-partitions may be saved.

Figure 5:
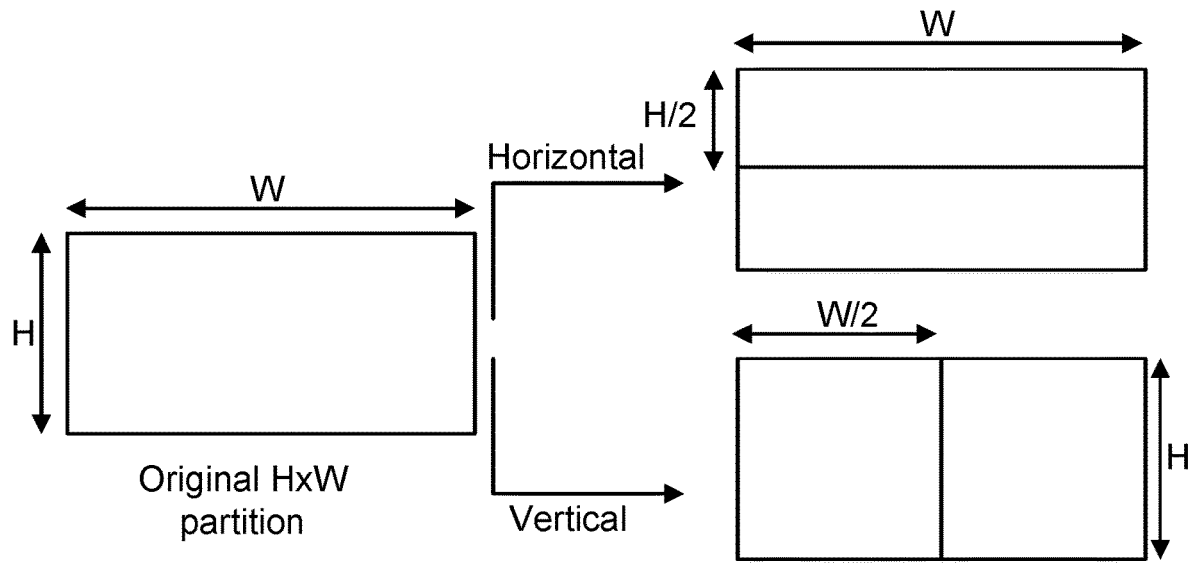
FIG. 5 shows example partitioning allowed for 4×8 and 8×4 CUs.
Figure 6:
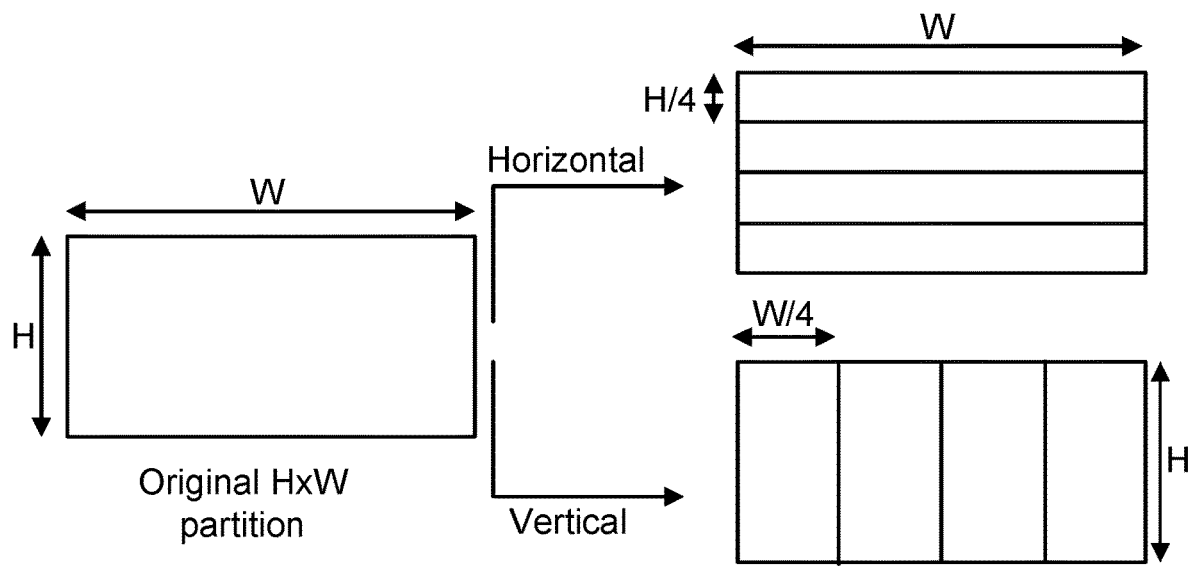
FIG. 6 shows an example partitioning allowed for coding units (CUs) greater than 4×8 or 8×4.

ISP may be applicable to luma components. In an example, ISP may not be applicable to chroma components. In an example, ISP may partition an intra mode CU into multiple (for example, two or four) sub-partitions. A (for example, each) partition may contain multiple (for example, at least 16) samples. The partitioning or CU-split may be performed in certain (for example, a horizontal or vertical) direction. In one or more examples, partition(ing) or split (ting) may be used interchangeably. FIG. 5 shows example partitioning allowed for 4×8 and 8×4 CUs. For relatively smaller CUs (for example, of size 4×8 and 8×4), ISP may split a CU into two sub-partitions, for example, as illustrated in FIG. 5. FIG. 6 shows an example partitioning allowed for CUs greater than 4×8 or 8×4. Relatively larger CUs may be split into four sub-partitions, for example, as illustrated in FIG. 6. An intra prediction mode may be used for some (for example, all) the sub-partitions. The MPM (most probable mode) flag may be set to one. For example, the intra mode used for ISP may be a member of the MPM list. Intra reference sample smoothing filter may be disabled for ISP. Reference line zero may be used for ISP. The use of multiple reference line intra prediction may be disabled.

For a horizontal split (mode), the sub-partitions may be processed from top to bottom. For a vertical split (mode), the sub-partitions may be processed from left to right. A (for example, each) sub-partition may be predicted. Residual may be added to it to yield reconstructed sub-partition. The samples from the reconstructed sub-partition may be used for predicting the next sub-partition.

Figure 7:
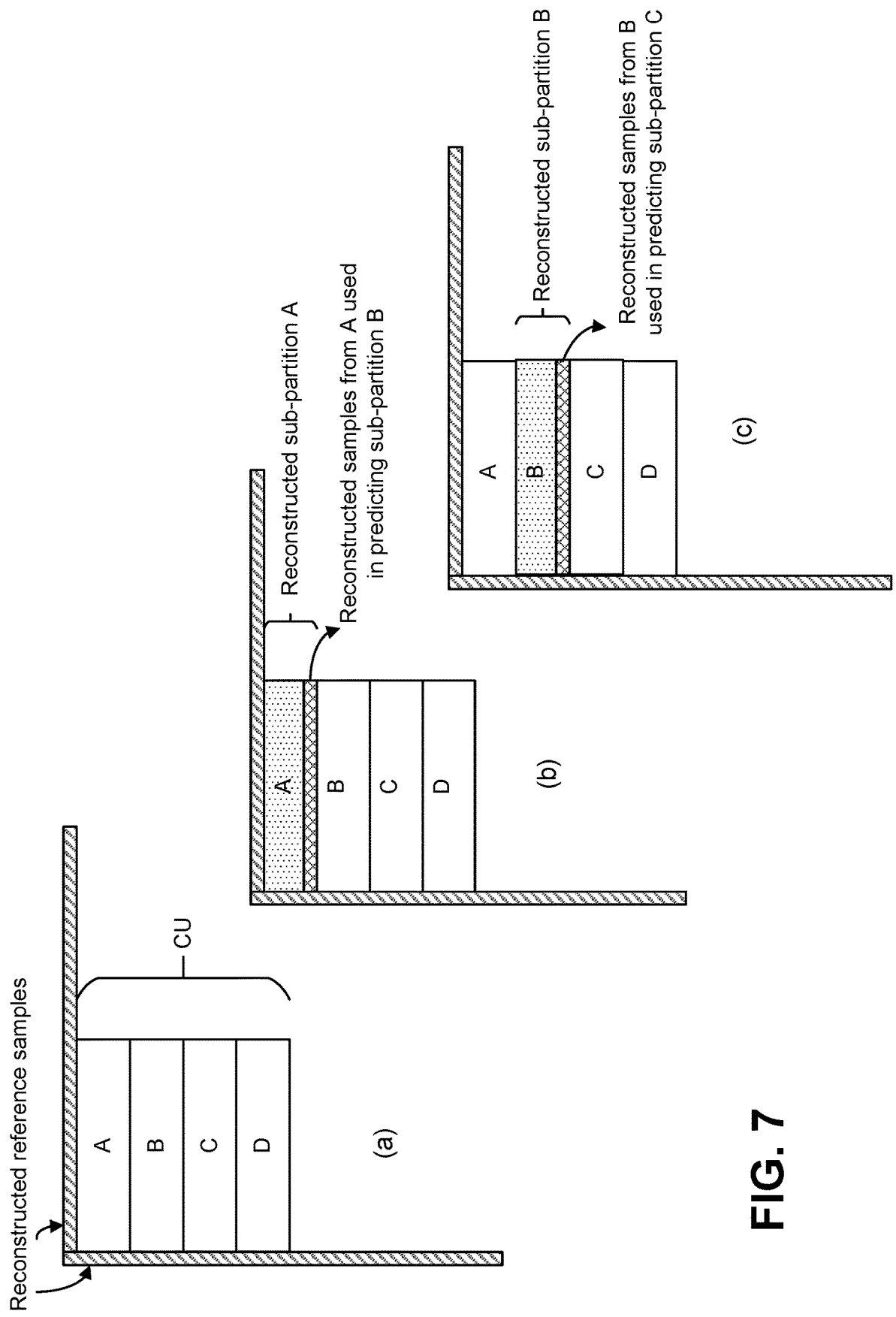
FIG. 7 shows an example of prediction process in intra sub-partition (ISP): (a) CU containing four sub-partitions A, B, C, and D; (b) sub-partition A may be predicted and reconstructed, and the bottom reconstructed row may be used in prediction of B; and (c) bottom row of reconstructed samples of B may be used for prediction of C.

FIG. 7 shows an example of prediction process in ISP: at (a) a CU may contain four sub-partitions A, B, C, and D; at (b) a sub-partition A (for example, a second sub-partition) may be predicted and reconstructed, and the bottom reconstructed row of sub-partition A may be used for the prediction of sub-partition B (for example, a first sub-partition); and at (c) a bottom row of reconstructed samples of sub-partition B may be used for prediction of sub-partition C (for example, a third sub-partition). As shown in FIG. 7 at (b), the top-most sub-partition A may be first predicted using the above and left reference lines (for example, reference samples in a reference CU), and reconstructed by adding residual obtained after entropy decoding, inverse quantization and inverse transform. The bottom row of reconstructed sub-partition A may be used for predicting sub-partition B, and may be then followed by reconstruction of sub-partition B. This process may be repeated for subsequent sub-partitions.

In an example, 1×N, 2×N sub-partitions may not be allowed for prediction units (PUs). Minimum 4×N sub-partitions may be allowed for PUs of ISP, for example, to enhance the hardware throughput performance. 1×N, 2×N sub-partitions may be allowed for transform units (TUs), for example, to maintain the resultant coding efficiency benefit.

Figure 8:
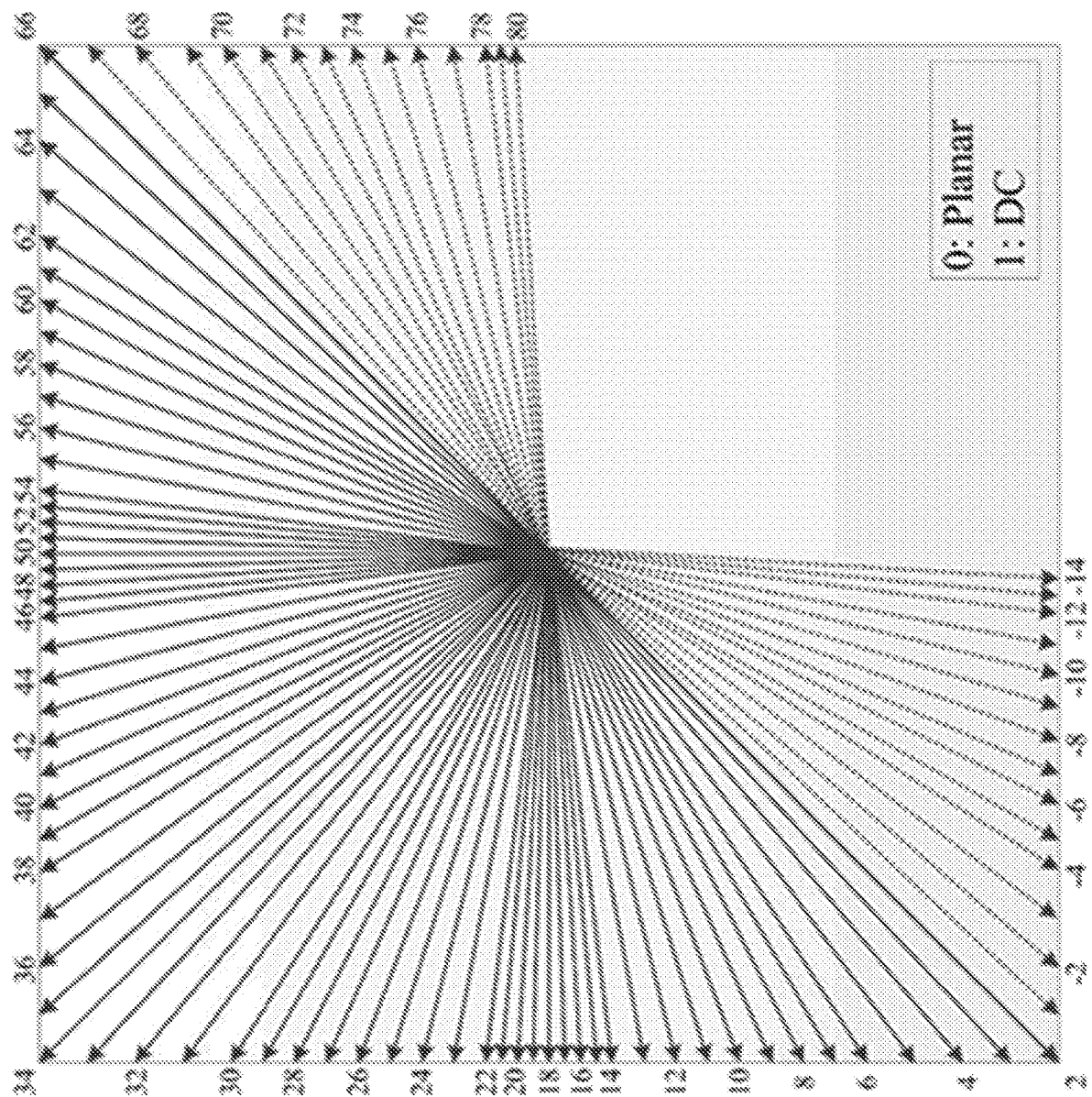
FIG. 8 shows an example of intra prediction modes (for example, including directional modes).

Extensions for intra-prediction modes may include more angular intra-prediction modes, an increase from 33 to 65 angles, wide angle prediction modes (for example, for non-square blocks), for example as shown in FIG. 8. FIG. 8 shows an example of intra prediction modes (for example, including directional modes). Intra mode with index 0 may be a planar mode, and intra mode with index 1 may be a DC mode. Infra mode with indices from 2 to 66 may be used for angular intra-prediction modes of squared blocks. Infra mode index from −1 to −14 and from 67 to 80 may be used for wide angle intra-prediction modes of non-squared blocks.

An intra wide angle mode may be used, for example, for non-square coding block(s).

Certain angular intra prediction directions may be defined from 45 degrees to −135 degrees in clockwise direction. For square coding block(s) with equal width and height, a regular intra angular mode (for example, with index 2, ... 66 as shown in FIG. 8) may be used for intra prediction. Wide angle intra prediction modes (for example, with index −1 ... −14 and 67 ... 80) may be used, for example, for non-square coding block(s) with unequal width and height. In an example, replaced modes may be signaled using the original mode indexes, which are remapped to the indexes of wide angular modes after parsing. The total number of intra prediction modes may be unchanged (for example, 67), and the intra mode coding may be unchanged.

Figure 9:
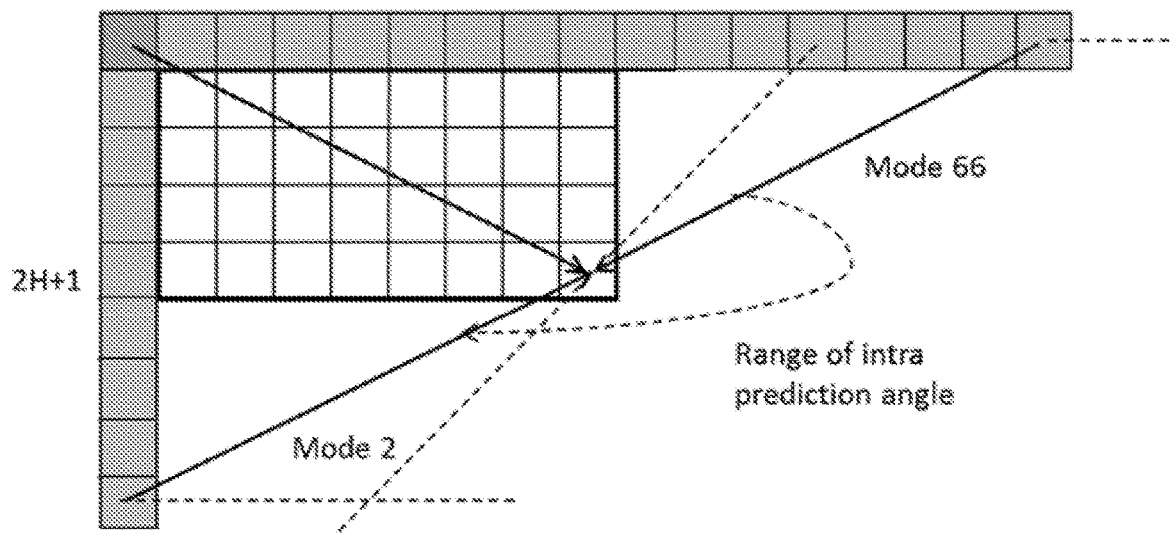
FIG. 9 illustrates example reference samples for wide-angular intra prediction, having, (a) a relatively greater width (than height) or (b) a relatively greater height (than width).
Figure 9:
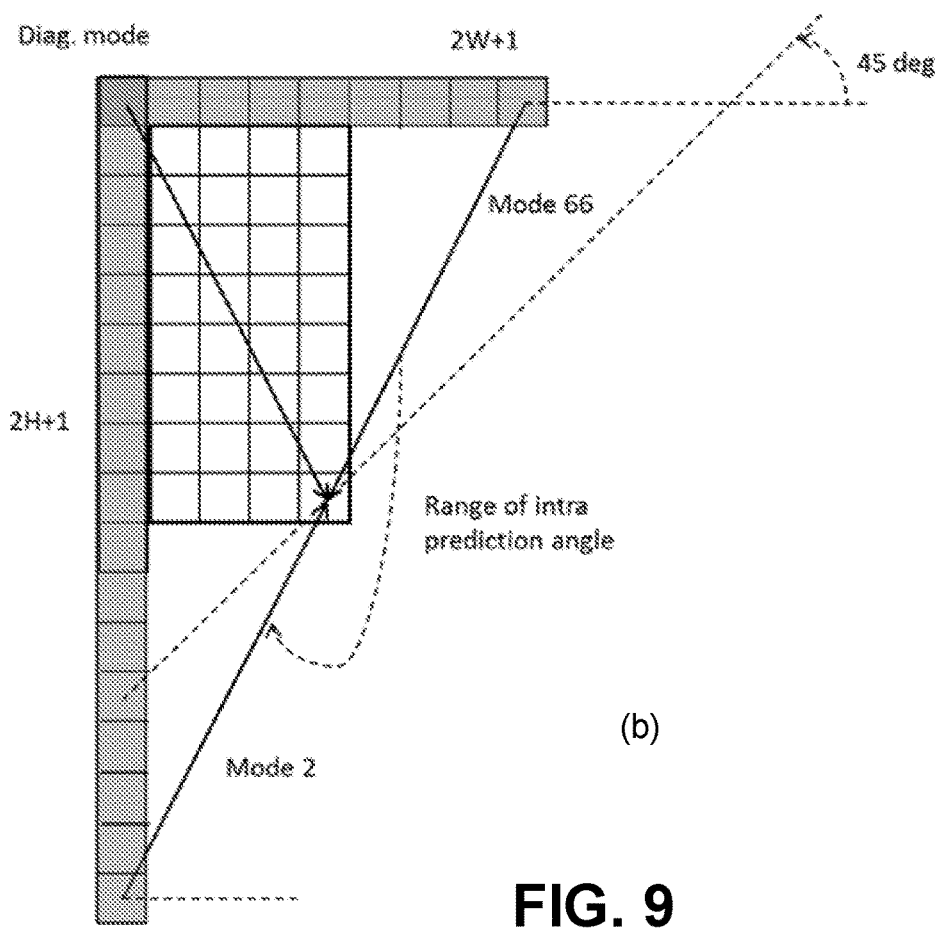

A wide angle mode may be illustrated in FIG. 9, which illustrates example reference samples for wide-angular intra prediction, having, (a) a relatively greater width (than height) or (b) a relatively greater height (than width). Table 1 shows an example wide angle intra prediction mode mapping process. As shown in Table 1, the original intra mode index may be mapped to a mode index value for a wide angle mode. As shown in Table 1, nW, nH may denote the width and height of a coding block, respectively. Table 1 provides an example wide angle intra prediction mode mapping process.

TABLE 1

Output of this process may be the intra prediction mode predModeIntra.
The variable whRatio may be set to (for example, equal to) Abs( Log2( nW/nH ) ).
For non-square blocks (nW is not equal to nH), the intra prediction mode predModeIntra may be obtained as follows:
  If the following (for example, all of the following) conditions are true, predModeIntra may be set equal to ( predModeIntra + 65 ).
    nW is greater than nH
    predModeIntra is greater than or equal to 2
    predModeIntra is less than ( whRatio > 1 ) ? ( 8 + 2 * whRatio ) : 8
  Otherwise, if the following (for example, all of the following) conditions are true, predModeIntra may be set to (for example, equal to) ( predModeIntra − 67 ).
    nH is greater than nW
    predModeIntra is less than or equal to 66
    predModeIntra is greater than ( whRatio > 1 ) ? ( 60 − 2 * whRatio ) : 60

Multiple reference line (MRL) intra prediction may be performed.

MRL intra prediction may use more reference lines for intra prediction. FIG. 10 illustrates an example of multiple reference lines (MRL) for intra prediction. FIG. 10 depicts an example of four reference lines. As shown in FIG. 10, the samples of segments A and F may not be fetched from reconstructed neighboring samples. The samples of segments A and F may be padded with the closest samples from segments B and E, respectively. Certain intra-picture prediction may use the nearest reference line (for example, reference line 0). In MRL, multiple additional lines (for example, two additional lines including reference line 1 and reference line 3) may be used.

The index of selected reference line (mrl_idx) may be signaled and/or used to generate an intra predictor. In examples, for reference line idx that is greater than 0, additional reference line modes (for example, only) may be included in MPM list, and/or mpm index (for example, only) may be signaled without a remaining mode. The reference line index may be signaled before intra prediction modes, and Planar and DC modes may be excluded from intra prediction modes in case where a nonzero reference line index is signaled. MRL may be disabled for the first line of blocks inside a CTU, for example, to prevent using extended reference samples outside the current CTU line.

Intra reference sample smooth filtering may be applied.

Smooth filtering may be applied to reference samples of intra modes, for example, to improve prediction performance. In certain examples, different reference sample smooth filtering may be applied for integer slope angles (for example, referring to full-pel reference samples) and fractional slope angles (for example, referring to fractional-pel reference samples). In an example, [1 2 1]/4 3-tap smooth filter may be applied to intra modes with indices of 0 (i.e. planar mode), −14, −12, −10, −6, 2, 34, 66, 72, 76, 78, 80, coding block size greater than 32. In some example, it is not applied if MRL or ISP is used.

For fractional slope angles, 4-tap Gaussian filter may be used. Not all the fractional slope angles may be applied with reference sample smooth filtering. In examples, for angles close to pure horizontal or vertical directions, 4-tap interpolation filter may be used (for example, as described herein). 4-tap interpolation filter may not be used to produce much smoothing effect.

Intra angular mode interpolation filtering may be performed.

For one or more angular intra modes (for example, the intra modes from mode index −14 to 80) shown in FIG. 8, filtering of reference samples may be used to generate prediction samples. For a luma component, filtering may be conducted with 4-tap components (for example, using the 4-tap filters as specified in Table 3). 2-tap linear interpolation may be used for chroma components. There may be one or more (for example, two) types of 4-tap filtering. For example, a first (for example a cubic) filter may be used (for example, for interpolation filtering) and/or a second (for example a Gaussian) filter may be used (for example, for smooth filtering). 4-tap Gaussian smooth filtering may be applied, for example, if the minimum angular mode distance off of the horizontal or vertical direction is above a value (for example, a predetermine value such as a threshold). 4-tap cubic interpolation filtering may be applied, for example, if the minimum angular mode distance off the horizontal or vertical direction is not above the threshold.

The selection decision may be represented via a variable "filterFlag." The variable "filterFlag" may be derived, for example, as shown in Table 2.

TABLE 2

If one or more of the following conditions is true, an variable filterFlag may be set equal to 0.
   refFilterFlag is equal to 1
   refIdx is not equal to 0
   IntraSubPartitionsSplitType is not equal to ISP_NO_SPLIT
Otherwise, the following may apply:
   The variable minDistVerHor may be set to (for example, equal to)
   Min( Abs( predModeIntra − 50 ), Abs( predModeIntra − 18 ) ).
   The variable intraHorVerDistThres[ n TbS ] may be specified in Table 4
   The variable filterFlag may be obtained (for example, derived) as follows:
     If minDistVerHor is greater than intraHorVerDistThres[ n TbS ] and refFilterFlag is equal to 0,
     filterFlag may be set equal to 1.
     Otherwise, filterFlag may be set equal to 0.

Table 3 provides an example of interpolation filter coefficients fC and fG.

TABLE 3

| Fractional sample position p | fC interpolation filter coefficients | | | | fG interpolation filter coefficients | | | |
|---|---|---|---|---|---|---|---|---|
| | $f_C[p][0]$ | $f_C[p][1]$ | $f_C[p][2]$ | $f_C[p][3]$ | $f_G[p][0]$ | $f_G[p][1]$ | $f_G[p][2]$ | $f_G[p][3]$ |
| 0 | 0 | 64 | 0 | 0 | 16 | 32 | 16 | 0 |
| 1 | −1 | 63 | 2 | 0 | 15 | 29 | 17 | 3 |
| 2 | −2 | 62 | 4 | 0 | 15 | 29 | 17 | 3 |
| 3 | −2 | 60 | 7 | −1 | 14 | 29 | 18 | 3 |
| 4 | −2 | 58 | 10 | −2 | 13 | 29 | 18 | 4 |
| 5 | −3 | 57 | 12 | −2 | 13 | 28 | 19 | 4 |
| 6 | −4 | 56 | 14 | −2 | 13 | 28 | 19 | 4 |
| 7 | −4 | 55 | 15 | −2 | 12 | 28 | 20 | 4 |
| 8 | −4 | 54 | 16 | −2 | 11 | 28 | 20 | 5 |
| 9 | −5 | 53 | 18 | −2 | 11 | 27 | 21 | 5 |
| 10 | −6 | 52 | 20 | −2 | 10 | 27 | 22 | 5 |
| 11 | −6 | 49 | 24 | −3 | 9 | 27 | 22 | 6 |
| 12 | −6 | 46 | 28 | −4 | 9 | 26 | 23 | 6 |
| 13 | −5 | 44 | 29 | −4 | 9 | 26 | 23 | 6 |
| 14 | −4 | 42 | 30 | −4 | 8 | 25 | 24 | 7 |

TABLE 3-continued

| Fractional sample position p | fC interpolation filter coefficients | | | | fG interpolation filter coefficients | | | |
|---|---|---|---|---|---|---|---|---|
| | $f_C[p][0]$ | $f_C[p][1]$ | $f_C[p][2]$ | $f_C[p][3]$ | fG[p][0] | fG[p][1] | fG[p][2] | fG[p][3] |
| 15 | −4 | 39 | 33 | −4 | 8 | 25 | 24 | 7 |
| 16 | −4 | 36 | 36 | −4 | 8 | 24 | 24 | 8 |
| 17 | −4 | 33 | 39 | −4 | 7 | 24 | 25 | 8 |
| 18 | −4 | 30 | 42 | −4 | 7 | 24 | 25 | 8 |
| 19 | −4 | 29 | 44 | −5 | 6 | 23 | 26 | 9 |
| 20 | −4 | 28 | 46 | −6 | 6 | 23 | 26 | 9 |
| 21 | −3 | 24 | 49 | −6 | 6 | 22 | 27 | 9 |
| 22 | −2 | 20 | 52 | −6 | 5 | 22 | 27 | 10 |
| 23 | −2 | 18 | 53 | −5 | 5 | 21 | 27 | 11 |
| 24 | −2 | 16 | 54 | −4 | 5 | 20 | 28 | 11 |
| 25 | −2 | 15 | 55 | −4 | 4 | 20 | 28 | 12 |
| 26 | −2 | 14 | 56 | −4 | 4 | 19 | 28 | 13 |
| 27 | −2 | 12 | 57 | −3 | 4 | 19 | 28 | 13 |
| 28 | −2 | 10 | 58 | −2 | 4 | 18 | 29 | 13 |
| 29 | −1 | 7 | 60 | −2 | 3 | 18 | 29 | 14 |
| 30 | 0 | 4 | 62 | −1 | 3 | 17 | 29 | 15 |
| 31 | 0 | 2 | 63 | −1 | 3 | 17 | 29 | 15 |

Table 4 provides an example of intraHorVerDistThres [nTbS] for various transform block sizes nTbS.

TABLE 4

| | nTbS = 2 | nTbS = 3 | nTbS = 4 | nTbS = 5 | nTbS = 6 | nTbS = 7 |
|---|---|---|---|---|---|---|
| intraHorVerDistThres[nTbS] | 24 | 14 | 2 | 0 | 0 | 0 |

A parameter refFilterFlag may indicate whether intra reference sample smooth filtering has been conducted earlier or not. A parameter refIdx may represent the index of the reference line, which, if not equal to 0, may indicate multiple reference line (MRL) of intra mode coding. A parameter IntraSubPartitionSplitType may indicate whether ISP is used and/or, if ISP is used, indicate whether horizontal or vertical split is used. A variable minDistVerHor may represent the minimum mode angle distance with respect to horizontal or vertical direction, which is compared with a block size dependent value (for example a threshold value), for example, to select between cubic (if filterFlag=0) and Gaussian (if filterFlag=1) 4-tap filters for interpolation. This decision condition may be referred to as "MDIS" condition.

In an example, for luma component, the involved 4-tap filters may be defined in Table 3. For the luma component, the involved 4-tap filters may be defined as shown in Table 3. In Table 3, fC and fG may stand for the cubic interpolation filter and the Gaussian smoothing filter, respectively.

For the luma component, one or more angular intra prediction samples may be obtained (for example, derived) as described herein. Without loss of generality, it may be assumed that the use of multiple reference lines may be omitted, and the single line of intra-prediction reference samples (for example, the top boundary and the left-side boundary of reference samples from the neighboring coded CUs or blocks) may be used.

For an intra mode index greater than or equal to a threshold (for example, 34), for example using the top boundary reference samples above the current coding block, for a prediction sample at position (x, y) inside the current coding block, an x-offset (for example, horizontal direction offset) may be calculated. The x-offset may be calculated based on the intra-prediction angle and/or the row (for example, vertical) distance to the top boundary of the reference samples. Parameters iIdx and iFact may be defined as follows:

$$iIdx=((( y+1)*intraPredAngle)>>5) \quad (1)$$

$$iFact=((y+1)*intraPredAngle)\&31 \quad (2)$$

where iIdx may represent a full-pel portion of the x-offset and iFact may represent a fractional-pel portion of the x-offset.

A variable intraPredAngle may capture the effect from a corresponding intra-prediction direction. The fractional position may be computed to a specific precision (for example, 1/32-pel).

Depending on the angular intra mode direction, a variable/parameter (for example, filterFlag) may be set to a value (for example, 0) if the direction is considered close to a horizontal or vertical direction, and to another value (for example, 1) otherwise. In an example, the variable/parameter may indicate whether a filter is used.

One or more interpolation filter coefficients fT[j] (for example, with j=0 . . . 3) may be determined (for example, derived) as follows:

$$fT[j]filterFlag?fG[iFact][j]:fC[iFact][j] \quad (3)$$

The value of prediction samples predSamples[x][y] may be determined (for example, derived) as follows:

$$predSamples[x][y] = \text{Clip}\left(\left(\left(\sum_{i=0}^{3} fT[i] * ref[x + iIdx + i]\right) + 32\right) >> 6\right) \quad (4)$$

where variable ref[x] may represent the top boundary reference sample at position (x, −1) (for example, where y=−1 indicates the top boundary). Clip(·) may be a function that clips a value into a range of pixel values (for example, valid pixel values).

For one or more (for example, all) other intra mode indices (for example, less than 34), a y-offset (for example, a vertical direction offset) may be derived, for example using the left boundary reference samples on the left side of the current coding block, based on the intra-prediction angle and the column (for example, horizontal) distance to the left-side boundary of reference samples. The corresponding equations may be the following:

$$iIdx = ((x+1)*intraPredAngle) >> 5 \quad (5)$$

$$iFact = ((x+1)*intraPredAngle) \& 31 \quad (6)$$

One or more interpolation filter coefficients fT[j] (for example, with j=0 . . . 3) may be derived as follows:

$$fT[j] = filterFlag?fG[iFact][j]:fC[iFact][j] \quad (7)$$

The value of prediction samples predSamples[x][y] may be derived as follows:

$$predSamples[x][y] = \text{Clip}\left(\left(\left(\sum\nolimits_{i=0}^{3} fT[i]*ref[y+iIdx+i]\right) + 32\right) >> 6\right) \quad (8)$$

For one or more chroma components, 2-tap linear filtering may be used for fractional reference sample positions, for example according to the following. If parameter iFact is not equal to 0, the value of the prediction samples predSamples[x][y] may be obtained (for example, derived) as follows:

$$predSamples[x][y] = ((32-iFact)*ref[x+iIdx+1] + iFact*ref[x+iIdx+2]+16) >> 5 \quad (9)$$

If parameter iFact is equal to 0, the value of the prediction samples predSamples[x][y] may be obtained (for example, derived) as follows:

$$predSamples[x][y] = ref[x+iIdx+1] \quad (10)$$

In examples, cubic filter may be (for example, always be) used for interpolation for MRL and/or ISP. For regular intra mode, MDIS condition check may be used to select between cubic and Gaussian filters.

Coding unit syntax may be used in association with luma intra prediction mode. Table 5 provides an example coding unit syntax on luma intra prediction mode.

TABLE 5

```
if( sps_mrl_enabled_flag && ( ( y0 % CtbSizeY ) > 0 ) )
  intra_luma_ref_idx[ x0 ][ y0 ]                                     ae(v)
if ( sps_isp_enabled_flag && intra_luma_ref_idx[ x0 ][ y0 ] = =
0 &&
  ( cbWidth <= MaxTbSizeY && cbHeight <= MaxTbSizeY ) &&
  ( cbWidth * cbHeight > MinTbSizeY * MinTbSizeY ) )
  intra_subpartitions_mode_flag[ x0 ][ y0 ]                          ae(v)
if( intra_subpartitions_mode_flag[ x0 ][ y0 ] = = 1 )
  intra_subpartitions_split_flag[ x0 ][ y0 ]                         ae(v)
if( intra_luma_ref_idx[ x0 ][ y0 ] = = 0 )
  intra_luma_mpm_flag[ x0 ][ y0 ]                                    ae(v)
if( intra_luma_mpm_flag[ x0 ][ y0 ] ) {
  if( intra_luma_ref_idx[ x0 ][ y0 ] = = 0 )
    intra_luma_not_planar_flag[ x0 ][ y0 ]                           ae(v)
  if( intra_luma_not_planar_flag[ x0 ][ y0 ] )
    intra_luma_mpm_idx[ x0 ][ y0 ]                                   ae(v)
} else
  intra_luma_mpm_remainder[ x0 ][ y0 ]                               ae(v)
```

Index intra_luma_ref_idx may signal the index of a (for example, one of) the multiple reference line(s) for MRL. The indications tra_subpartitions_mode_flag and intra_subpartitions_split_flag may signal the ISP mode and split mode, respectively. The rest of the flag variables may be for MPM and intra prediction mode derivation.

For the entropy coding of an indication intra_luma_not_planar_flag, multiple (for example, two) context coded bins may be used. Which one to use may be dependent on an indication intra_subpartitions_mode_flag (for example, indicating whether ISP is used or not). If intra_subpartitions_mode_flag is equal to 0, (indicating that ISP is not used) context coded bin with index 1 (for example, the $2^{nd}$ bin) may be used. Otherwise, the $1^{st}$ context coded bin may be used (for example, the one with index 0).

For a certain CU, the ISP split mode may or may not depend on the intra prediction mode. In examples, an ISP split mode may depend on the CU intra prediction mode such that in the sub-partitions resulted from the ISP split mode, a later coded (for example, first) sub-partition's intra prediction may refer to the reconstructed samples of a previous coded (for example, second) ISP sub-partition. The ISP split mode that depends on the intra prediction mode may have coding benefit or advantage over the ISP split mode that does not depend on the intra prediction mode.

In certain examples, intra prediction reference sample filtering may be disabled if a CU is coded in an ISP mode, for example, due to the utilization of 1×N, 2×N, N×2 TUs and other CU sizes that are of substantially large width vs height difference (for example, 4×32, 4×64, etc.), and a ISP split mode restriction based on intra prediction mode may not be used in this example.

As an example, for 1×N, 2×N, N×2 TUs, if the CU intra prediction mode refers to top boundary reference samples in case of 1×N, 2×N TUs, or it refers to left boundary reference samples in case of N×2 TUs, more reference sample filtering may lead to large prediction performance variations or degradations along the longer dimension of the TU.

The ISP split mode may be determined (for example, to be restricted) based on intra prediction mode. A CU may be processed based on the determined split mode (for example, as shown in 1230 of FIG. 12). In an ISP split mode, sub-partitions (for example, a first sub-partition) may refer to previously reconstructed sub-partition (for example, a second) samples for intra prediction. In an example, for the 1×N, 2×N, N×2 TU cases, intra prediction may refer to reference samples on the side of their longer dimension (for example, the side of N samples, but not the shorter side of 1 or 2 samples). The risk of having much varied or degraded prediction performance inside 1×N, 2×N, N×2 TUs may be substantially reduced. A restriction on intra reference filtering may not be used. Intra reference filtering may be performed. More filtering similar to that for non-ISP mode may yield better coding efficiency for ISP mode.

Table 6 provides an example of intra reference sample filtering in certain instances.

TABLE 6

| | ISP | MRL | Regular intra modes |
| --- | --- | --- | --- |
| Smooth filtering for integer slope angles | N/A | N/A | [1 2 1]/4 3-tap filter |
| Interpolation filtering for fractional slope angles | 4-tap Cubic filter | 4-tap Cubic filter | 4-tap Cubic or Gaussian filter |

In certain examples, reference sample smoothing filtering may not be applied for ISP or MRL. The difference of intra reference sample filtering application on ISP, MRL, and regular intra modes may be shown in Table 6. A unified approach that is applicable to ISP, MRL, and regular intra modes may be used. The unified approach may support consistency among that ISP, MRL, and regular intra modes.

One or more ISP related approaches may be used, including: an ISP split mode restriction(s) based on an intra prediction mode and unified intra reference sample filtering for MRL, ISP and regular intra modes.

An ISP split mode may be selected based on an intra prediction mode. An intra prediction mode may be coded before an ISP split mode that indicates the splitting mode has a splitting direction (for example, horizontal or vertical).

In a certain example, given an angular intra prediction mode of a CU, if the CU is coded into ISP, the CU may be partitioned into multiple (for example, 2 or 4) sub-partitions, which may be coded one by one. After one sub-partition is coded, the next sub-partition may use the previous (for example, the immediate previous) sub-partition's reconstructed samples as its reference samples for intra prediction. A CU may be split horizontally or vertically. With a certain ISP split mode, the next sub-partition may or may not refer to the previous sub-partition reconstructed samples based on the provided CU intra prediction angle.

In examples, an ISP split mode may depend on the CU intra prediction mode such that for a certain CU intra prediction mode, the ISP split mode (for example, only the ISP split mode) with which the sub-partition intra prediction refers to the reconstructed samples of the previous coded sub-partition(s) may be used.

The coding overhead of signaling the ISP split mode may be reduced in many cases, and thus, the overall coding performance may be improved. This is illustrated, for example, in FIG. 11, which shows examples of an ISP split mode restricted by an intra prediction mode(s).

An intra prediction mode (for example, a directional mode) for a CU may be identified by an intra prediction mode index. One or more of intra prediction modes may be shown in FIG. 8. A CU intra prediction mode index may be represented with an input variable named "predIntraMode." As shown in 1210 of FIG. 12, an intra-prediction mode may be determined for a CU, for example, using the intra-prediction mode index. The ISP split mode may be indicated by or coded into a variable named intra_subpartitions_split_flag. The intra prediction modes may be categorized into multiple (for example, three) sets {S1|predIntraMode>predIntraMode0}, {S2|predIntraMode<predIntraMode1 and predIntraMode is not equal to 0 and predIntraMode is not equal to 1}, {S3|remaining intra prediction modes, for example, the nodes that do not belong to S1 or S2}. An intra prediction mode may belong to a set (for example, only one set among S1, S2 and S3). predIntraMode0 and predIntraMode1 may be pre-determined intra prediction modes. Parameters predIntraMode0 and predIntraMode1 may be CU size dependent.

Figure 11:
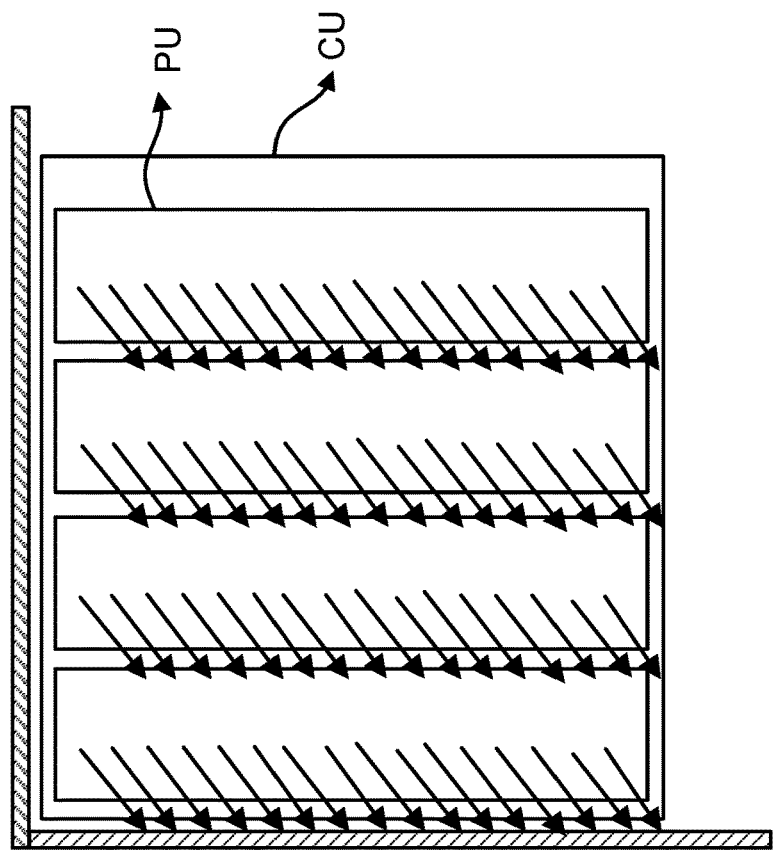
FIG. 11 shows examples of an ISP split mode restricted by an intra prediction mode(s): (a) horizontal ISP split for intra mode; and (b) vertical ISP split for intra mode.
Figure 11:
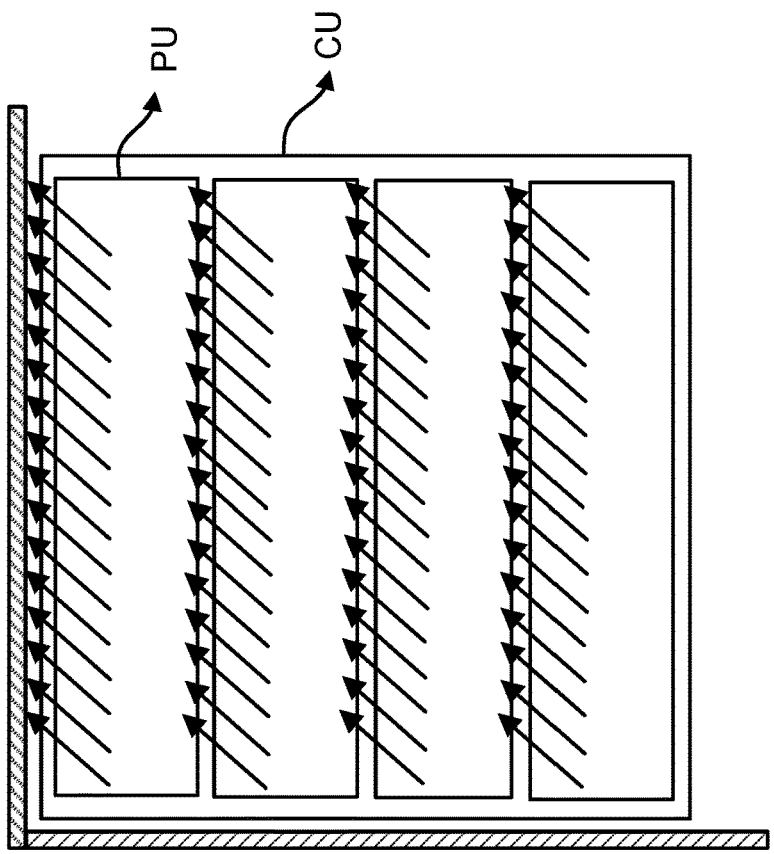

FIG. 11, for example at (a), illustrates an example of horizontal ISP split for intra mode referring to top boundary reference samples. An indication (for example, intra_subpartitions_split_flag) may be determined (for example, inferred) to be a value indicating horizontal ISP split. As shown in 1220 of FIG. 12, a split mode may be determined based on the intra-prediction mode to generate a plurality of sub-partitions in the CU. The split mode may include a vertical split or a horizontal split. As illustrated in FIG. 11 at (a), if predIntraMode belongs to set S1 (for example, angular intra prediction may refer to top boundary reference samples), intra_subpartitions_split_flag may be inferred to be equal to 0 indicating horizontal ISP split and not coded in the bitstream. In one or more examples herein, coding block and CU may be used interchangeably. As shown in FIGS. 11(a) and (b), a CU may include a square CU that has a width and a height that are equal, and a plurality of sub-partitions in the CU may be rectangular.

FIG. 11, for example at (b), illustrates an example of vertical ISP split for intra mode referring to left boundary reference samples. An indication (for example, intra_subpartitions_split_flag) may be inferred to be a value indicating vertical ISP split. As illustrated in FIG. 11, at (b), if predIntraMode belongs to set S2, (for example, angular intra prediction may refer to left boundary reference samples), intra_subpartitions_split_flag may be inferred to be equal to 1 indicating vertical ISP split and not coded in the bitstream.

An indication (for example, intra_subpartitions_split_flag) may be determined (for example, inferred to be) a value indicating vertical ISP split or horizontal ISP split. If predIntraMode does not belong set S1 or set S2, predIntraMode may belong to S3, intra_subpartitions_split_flag may be coded into either 0 or 1 in the bitstream.

In an example, for a first intra-prediction mode(s) (for example, predIntraMode<=18), the prediction samples of a (for example, the current) coding block may be referring to the left boundary reference samples. For a second intra-prediction mode(s) (for example, predIntraMode from 18 to 33), a prediction of a block (for example, the current block prediction) may refer to the left boundary reference samples and the top boundary reference samples. The portion of the referred top boundary reference samples may be increased from a little above 0% (for example, for predIntraMode=19) to a little below 50% (for example, for predIntraMode=33) of the block. For a third intra-prediction mode(s) (for example, predIntraMode>=50), the prediction samples of a coding block (for example, the current coding block) may include, for example, be referring to, the top boundary reference samples. For a fourth intra-prediction mode(s) (for example, predIntraMode from 49 to 34), a prediction of a block (for example, the current block prediction) may refer to the top boundary reference samples and the left boundary reference samples. The portion of the referred left boundary reference samples may be increased from a little above 0% (for example, for predIntraMode=49) to around 50% (for example, for predIntraMode=34) of the block. The CU may be split into multiple PUs (for example, a PU may include a single sub-partition or multiple partitions). FIG. 11(a) and FIG. 11(b) show examples of the CU(s) that is split into multiple sub-partitions. The CU may be processed based on the split mode (for example, using the multiple sub-partitions that are generated based on the split mode).

Angular intra modes may refer more to the left boundary reference samples than to the top boundary reference samples, or vice versa. In examples, predIntraMode0 may be set to 33, and predIntraMode1 may be set to 34. Set S1 (or S2) may represent angular intra modes that refer more to the left boundary reference samples than to the top boundary reference samples. Set S2 may represent angular intra modes that refer more to the top boundary reference samples than to the left boundary reference samples.

Reference samples at a location (e.g., a boundary of a coding unit) may be on or adjacent to the location (for example, a current CU). Reference samples at a left boundary may be on or adjacent to the left boundary of a CU (for example, a current CU). Reference samples at a top boundary may be on or adjacent to the top boundary of a CU (for example, a current CU). "Adjacent" may include different types of adjacency, such as an adjacent block, an adjacent sub-block, an adjacent pixel, and/or a sample adjacent to a boundary. For example, an adjacent sample is a sample that may be a spatial or a temporal neighbor. A boundary reference sample is a reference sample adjacent to a boundary, where a boundary may be any type of boundary. For example, a boundary reference sample may be adjacent to a boundary of a block, a sub-block, a CU, and/or a PU.

Angular intra modes may refer to the left boundary reference samples and not the top boundary reference samples, or vice versa. In examples, predIntraMode0 may be set to 19, and predIntraMode1 may be set to 49. S1 may represent angular intra modes that refer completely to the left boundary reference samples, but not any of the top boundary reference samples. S2 may represent angular intra modes that refer completely to the top boundary reference samples, but not any of the left boundary reference samples.

In examples, predIntraMode0 may be set to be a value between 19 and 33, and predIntraMode1 may be set to a value between 49 and 34.

Wide angle intra mode(s) may be handled, for example, using one or more examples as described herein.

The ISP split mode derivation and/or restriction as described herein may apply to square coding blocks with equal width and height, for example, only square coding blocks with equal width and height. In examples, the ISP split mode derivation and/or restriction as described herein may not apply to non-square coding blocks, which may have wide angle intra prediction modes.

In examples, the approach as described herein may be applied to both square and non-square coding blocks. The original mode indication predIntraMode may be checked and may be mapped to a value for non-square coding blocks (for example, as described herein). The mode indication predIntraMode may be converted to cover the regular angle and the wide angle intra modes. The ISP split mode determination as described herein may be based on the converted mode indication predIntraMode that covers both the regular angle and the wide angle intra modes.

Syntax of coding unit may support the application of the ISP split mode restriction, for example, as shown in Table 7 or Table 8. The coding dependency of indication intra_luma_not_planar_flag on indication intra_subpartitions_mode_flag may be addressed using the examples herein.

In an example, indication intra_subpartitions_split_flag may be signaled and/or received after some (for example, all) the MPM variables. As shown in Table 7, the intra_luma_not_planar_flag context coded bin selection may be the same as Table 5 (for example, depending on intra_subpartitions_mode_flag). The position of indication intra_subpartitions_mode_flag may be the same as in Table 5. Indication intra_subpartitions_split_flag may be signaled and/or received after all the MPM variables. This may improve coding efficiency. Table 7 provides an example coding unit syntax where indication intra_subpartitions_split_flag is after the MPM variables.

TABLE 7

```
if( sps_mrl_enabled_flag && ( ( y0 % CtbSizeY ) > 0 ) )
    intra_luma_ref_idx[ x0 ][ y0 ]                                    ae(v)
if ( sps_isp_enabled_flag && intra_luma_ref_idx[ x0 ][ y0 ] = =
0 &&
    ( cbWidth <= MaxTbSizeY && cbHeight <= MaxTbSizeY ) &&
    ( cbWidth * cbHeight > MinTbSizeY * MinTbSizeY ) )
    intra_subpartitions_mode_flag[ x0 ][ y0 ]                         ae(v)
if( intra_luma_ref_idx[ x0 ][ y0 ] = = 0 )
    intra_luma_mpm_flag[ x0 ][ y0 ]                                   ae(v)
if( intra_luma_mpm_flag[ x0 ][ y0 ] ) {
    if( intra_luma_ref_idx[ x0 ][ y0 ] = = 0 )
        intra_luma_not_planar_flag[ x0 ][ y0 ]                        ae(v)
    if( intra_luma_not_planar_flag[ x0 ][ y0 ] )
        intra_luma_mpm_idx[ x0 ][ y0 ]                                ae(v)
} else
```

TABLE 7-continued

```
    intra_luma_mpm_remainder[ x0 ][ y0 ]                              ae(v)
if( intra_subpartitions_mode_flag[ x0 ][ y0 ] = = 1 )
    intra_subpartitions_split_flag[ x0 ][ y0 ]                        ae(v)
```

In an example, the intra_luma_not_planar_flag context coded bin dependency on ISP mode may be removed. The ISP related flag variables (for example, both intra_subpartitions_mode_flag, intra_subpartitions_split_flag) may be signaled and/or received after the MPM variables. As shown in Table 8, an example coding unit syntax where indications intra_subpartitions_mode_flag and intra_subpartitions_split_flag may be after all the MPM variables is shown. This may improve clarity.

TABLE 8

```
if( sps_mrl_enabled_flag && ( ( y0 % CtbSizeY ) > 0 ) )
    intra_luma_ref_idx[ x0 ][ y0 ]                                    ae(v)
if( intra_luma_ref_idx[ x0 ][ y0 ] = = 0 )
    intra_luma_mpm_flag[ x0 ][ y0 ]                                   ae(v)
if( intra_luma_mpm_flag[ x0 ][ y0 ] ) {
    if( intra_luma_ref_idx[ x0 ][ y0 ] = = 0 )
        intra_luma_not_planar_flag[ x0 ][ y0 ]                        ae(v)
    if( intra_luma_not_planar_flag[ x0 ][ y0 ] )
        intra_luma_mpm_idx[ x0 ][ y0 ]                                ae(v)
} else
    intra_luma_mpm_remainder[ x0 ][ y0 ]                              ae(v)
if ( sps_isp_enabled_flag && intra_luma_ref_idx[ x0 ][ y0 ] = =
0 &&
    ( cbWidth <= MaxTbSizeY && cbHeight <= MaxTbSizeY ) &&
    ( cbWidth * cbHeight > MinTbSizeY * MinTbSizeY ) )
    intra_subpartitions_mode_flag[ x0 ][ y0 ]                         ae(v)
if( intra_subpartitions_mode_flag[ x0 ][ y0 ] = = 1 )
    intra_subpartitions_split_flag[ x0 ][ y0 ]                        ae(v)
```

Intra reference sample filtering may be unified.

As a result of one or more examples herein, for 1×N, 2×N, N×2 or other CU sizes that are of large width vs height difference (for example, 4×32, 4×64, etc.), sub-partition intra prediction may refer to the line of reference samples that is lying along the longer side of the sub-partition. Sub-partition intra prediction may not refer to the line of reference samples that is lying along the shorter (for example, substantially shorter) side of the sub-partition. Referring to the line of reference samples that is lying along the longer side of the sub-partition may lead to better prediction performance than that from using the reference samples along the substantially shorter side of the sub-partition. In examples, one or more restrictions on applying intra reference sample smoothing filtering on ISP modes may be skipped. Better coding efficiency may be achieved.

In some examples, intra reference sample filtering (for example, including smooth filtering and interpolation filtering) for ISP and MRL may be different from that for the regular intra modes. A unified approach may be used for ISP, MRL, and the regular intra modes.

In an example, intra reference sample filtering of regular intra modes may be aligned the same as that of the ISP intra mode. Reference sample smoothing filtering may not be used for integer slope angles, and 4-tap Cubic filter for interpolation filtering may be used for fractional slope angles, for ISP, MRL, and the regular intra modes. Table 9 provides an example of intra reference sample filtering unification toward ISP and MRL.

TABLE 9

|  | ISP | MRL | Regular intra modes |
|---|---|---|---|
| Smooth filtering for integer slope angles | N/A | N/A | N/A |
| Interpolation filtering for fractional slope angles | 4-tap Cubic filter | 4-tap Cubic filter | 4-tap Cubic filter |

In an example, intra reference sample filtering of ISP and MRL intra modes may be aligned the same with that of the regular intra modes, 3-tap reference sample smoothing filtering may be applied for integer slope angles and 4-tap Cubic filter or Gaussian filter may be used for interpolation filtering of fractional slope angles, for ISP, MRL, and the regular intra modes. Table 10 provides an example of intra reference sample filtering unification toward regular intra modes.

TABLE 10

|  | ISP | MRL | Regular intra modes |
|---|---|---|---|
| Smooth filtering for integer slope angles | [1 2 1]/4 3-tap filter | [1 2 1]/4 3-tap filter | [1 2 1]/4 3-tap filter |
| Interpolation filtering for fractional slope angles | 4-tap Cubic or Gaussian filter | 4-tap Cubic or Gaussian filter | 4-tap Cubic or Gaussian filter |

An intra sub-partition (ISP) split mode may be determined (for example, restricted) based on an intra prediction mode. An ISP split mode may depend on CU intra prediction mode such that in the sub-partitions resulted from the ISP split mode, a later coded (for example, a first) sub-partition's intra prediction may refer to the reconstructed samples of a previous coded (for example, a second) ISP sub-partition.

In examples, the ISP split mode determination (for example, derivation and/or restriction) as described herein may not apply to non-square coding blocks, which may have wide angle intra prediction modes. In examples, the approach as described herein may be applied to both square and non-square coding blocks. The ISP split derivation as described herein may be based on the converted mode indication predIntraMode that covers both the regular angle and the wide angle intra modes.

A unified approach may be used for ISP, MRL, and the regular intra modes. In an example, intra reference sample filtering for regular intra modes may be aligned with that for the ISP intra mode, Reference sample smoothing filtering may not be used for integer slope angles, and 4-tap Cubic filter for interpolation filtering may be used for fractional slope angles, for ISP, MRL, and the regular intra modes. In an example, intra reference sample filtering for ISP and MRL intra modes may be aligned with that for the regular intra modes. 3-tap reference sample smoothing filtering may be applied for integer slope angles, and 4-tap Cubic filter or Gaussian filter may be used for interpolation filtering of fractional slope angles, for ISP, MRL, and the regular intra modes.

Figure 12:
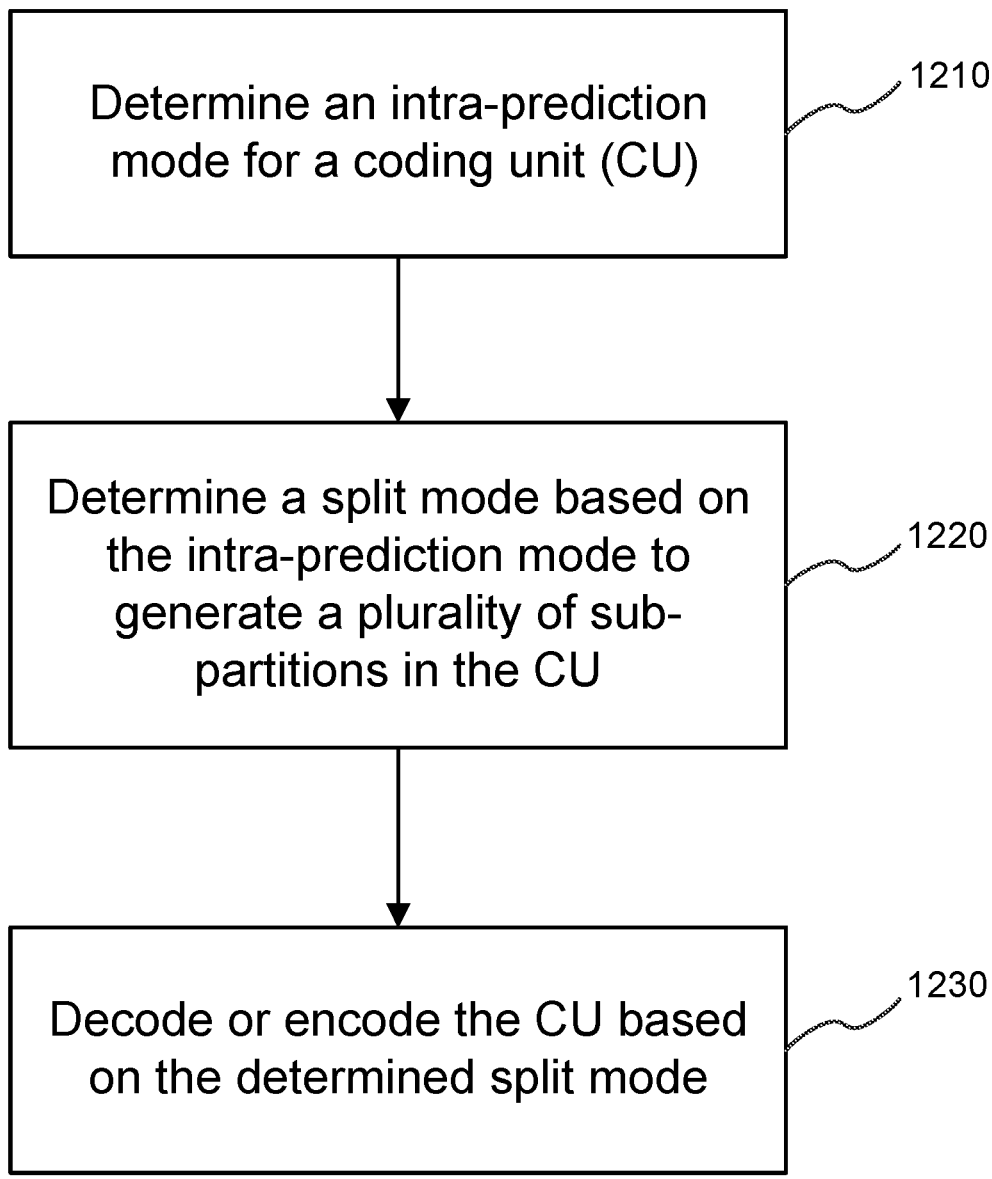
FIG. 12 illustrates an example of a method 1200 for decoding or encoding a CU using a split mode based on an intra-prediction mode according to one or more examples described herein.

FIG. 12 illustrates an example of a method 1200 for decoding or encoding a CU using a split mode based on an intra-prediction mode according to one or more examples described herein. Examples disclosed herein and other examples may operate in accordance with example method 1200, for example, an apparatus comprising one or more processors may perform the method. At 1210, an intra-prediction mode is determined for a coding unit (CU), for example, using the input variable "predIntraMode." At 1220, a split mode based on the intra-prediction mode to generate a plurality of sub-partitions in the CU is determined, for example, as shown in FIG. 11(a) and FIG. 11(b)). A prediction for a first sub-partition of the plurality of sub-partitions in the CU may be based on a reference sample in a second sub-partition of the plurality of sub-partitions in the CU, as described herein (for example, in FIG. 7). At 1230, the CU may be decoded or encoded based on the determined split mode (for example, as shown in FIG. 11(a) and FIG. 11(b)). When the method of FIG. 12 is applied to a decoder, 1210, 1220, and 1230 may be performed by the decoder. 1230 may entail decoding the CU based on the determined split mode. When the method of FIG. 12 is applied to an encoder, 1210, 1220, and 1230 may be performed by the encoder. 1230 may entail encoding the CU based on the determined split mode.

Many embodiments are described herein. Features of embodiments may be provided alone or in any combination, across various claim categories and types. Further, embodiments may include one or more of the features, devices, or aspects described herein, alone or in any combination, across various claim categories and types, such as, for example, any of the following:

The method as described in FIG. 12 may be based on one or more examples as described herein, for example, by a decoder. The decoder (for example, decoder 300 in FIG. 3) may be configured to determine an intra-prediction mode for a CU, for example, using an intra-prediction mode index, as described herein. The decoder may be configured to determine a split mode based on the intra-prediction mode to generate a plurality of sub-partitions in the CU, for example, as shown in FIGS. 11(a) and 11(b). A prediction for a first sub-partition of the plurality of sub-partitions in the CU may be based on a reference sample in a second sub-partition of the plurality of sub-partitions in the CU, as described herein. The decoder may be configured to decode the CU based on the determined split mode, for example, as described herein.

The decoder may be configured partition the CU into the plurality of sub-partitions based on the determined split mode and reconstruct the second sub-partition comprising the reference sample based on a plurality of samples in a reference CU, for example, as shown in FIG. 11(a) and FIG. 11(b). The decoder may be configured to determine, based on the intra-prediction mode, whether the CU is to be decoded based on a first plurality of reference samples that are adjacent to a left boundary of the CU, based on a second plurality of reference samples that are adjacent to a top boundary of the CU, or based on at least one of the first plurality of reference samples and at least one of the second plurality of reference samples, as described herein.

The split mode may be a horizontal split mode. The split mode may be a vertical split mode. On a condition that the intra-prediction mode indicates that the CU is to be decoded based on a first plurality of reference samples that are adjacent to a left boundary of the CU, the split mode may be a vertical split mode. On a condition that the intra-prediction mode indicates that the CU is to be decoded based on a second plurality of reference samples that are adjacent to a top boundary of the CU, the split mode may be a horizontal split mode. On a condition that the intra-prediction mode indicates that the CU is to be decoded based on a first plurality of reference samples that are adjacent to a left boundary of the CU and based on a second plurality of reference samples that are adjacent to a top boundary of the CU, the split mode may be determined based on a determination of whether the first plurality of reference samples are more than the second plurality of reference samples.

An intra sub-partition (ISP) may be enabled. The split mode for ISP may be indicated in an intra_subpartitions_split_flag.

The intra-prediction mode may be identified by an intra-prediction mode index and may be associated with a predetermined prediction direction. The intra-prediction mode for the CU may be a vertical prediction mode, for example, as shown in FIG. 8. The intra-prediction mode for the CU may be a horizontal prediction mode, for example, as shown in FIG. 8. The intra-prediction mode for the CU may be an angular prediction mode, for example, as shown in FIG. 8. The intra-prediction mode for the CU may be a DC prediction mode, for example, as shown in FIG. 8. The intra-prediction mode for the CU may be a planar prediction mode, for example, as shown in FIG. 8. The CU may be a square CU that has a width and a height that are equal, and the plurality of sub-partitions may be rectangular (for example, as shown in FIGS. 11(a) and 11(b)). The CU may be a non-square CU, and the intra-prediction mode may be a wide angle intra-prediction mode.

Decoding tools and techniques including one or more of entropy decoding, inverse quantization, inverse transformation, and differential decoding may be used to enable the method as described in FIG. 12 in the decoder. These decoding tools and techniques may be used to enable one or more of determining an intra-prediction mode for a CU, for example, using an intra-prediction mode index, as described herein; determining a split mode based on the intra-prediction mode to generate a plurality of sub-partitions in the CU, for example, as shown in FIGS. 11(a) and 11(b) such that a prediction for a first sub-partition of the plurality of sub-partitions in the CU may be based on a reference sample in a second sub-partition of the plurality of sub-partitions in the CU, as described herein; decoding the CU based on the determined split mode, for example, as described herein; partitioning the CU into the plurality of sub-partitions based on the determined split mode and reconstructing the second sub-partition comprising the reference sample based on a plurality of samples in a reference CU, for example, as shown in FIG. 11(a) and FIG. 11(b); determining, based on the intra-prediction mode, whether the CU is to be decoded based on a first plurality of reference samples that are adjacent to a left boundary of the CU, based on a second plurality of reference samples that are adjacent to a top boundary of the CU, or based on at least one of the first plurality of reference samples and at least one of the second plurality of reference samples, as described herein; selecting a vertical split mode on a condition that the intra-prediction mode indicates that the CU is to be decoded based on a first plurality of reference samples that are adjacent to a left boundary of the CU; selecting a horizontal split mode for the CU on a condition that the intra-prediction mode indicates that the CU is to be decoded based on a second plurality of reference samples that are adjacent to a top boundary of the CU; selecting the split mode based on a determination of whether the first plurality of reference samples are more than the second plurality of reference samples on a condition that the intra-prediction mode indicates that the CU is to be decoded based on a first plurality of reference samples that are adjacent to a left boundary of the CU and based on a second plurality of reference samples that are adjacent to a top boundary of the CU; determining ISP is or is not enabled for the CU; receiving or setting an intra_subpartitions_split-flag for the split mode for ISP; identifying the intra-prediction mode based an intra-prediction mode index and determining a predetermined prediction direction associated with the intra-prediction mode; selecting a wide angle intra-prediction mode for a non-square CU; and other decoder behaviors that are related to any of the above.

The method as described in FIG. 12 may be based on one or more examples as described herein, for example, by an encoder. The encoder (for example, encoder 200 in FIG. 2) may be configured to determine an intra-prediction mode for a CU, for example, using an intra-prediction mode index, as described herein. The encoder may be configured to determine a split mode based on the intra-prediction mode to generate a plurality of sub-partitions in the CU, for example, as shown in FIGS. 11(a) and 11(b). A prediction for a first sub-partition of the plurality of sub-partitions in the CU may be based on a reference sample in a second sub-partition of the plurality of sub-partitions in the CU, as described herein. The encoder may be configured to encode the CU based on the determined split mode, for example, as described herein.

The encoder may be configured to partition the CU into the plurality of sub-partitions based on the determined split mode and reconstruct the second sub-partition comprising the reference sample based on a plurality of samples in a reference CU, for example, as shown in FIG. 11(a) and FIG. 11(b). The encoder may be configured to determine, based on the intra-prediction mode, whether the CU is to be encoded based on a first plurality of reference samples that are adjacent to a left boundary of the CU, based on a second plurality of reference samples that are adjacent to a top boundary of the CU, or based on at least one of the first plurality of reference samples and at least one of the second plurality of reference samples, as described herein. The encoder may be configured to determine a vertical split mode for the CU on a condition that the intra-prediction mode indicates that the CU is to be encoded based on a first plurality of reference samples that are adjacent to a left boundary of the CU. The encoder may be configured to determine a horizontal split mode for the CU on a condition that the intra-prediction mode indicates that the CU is to be encoded based on a second plurality of reference samples that are adjacent to a top boundary of the CU. The encoder may be configured to select a split mode based on a determination of whether the first plurality of reference samples are more than the second plurality of reference samples on a condition that the intra-prediction mode indicates that the CU is to be encoded based on a first plurality of reference samples that are adjacent to a left boundary of the CU and based on a second plurality of reference samples that are adjacent to a top boundary of the CU.

Encoding tools and techniques including one or more of quantization, entropy coding, inverse quantization, inverse transformation, and differential coding may be used to enable the method as described in FIG. 11 in the encoder. These encoding tools and techniques may be used to enable determining an intra-prediction mode for a CU, for example, using an intra-prediction mode index, as described herein; determining a split mode based on the intra-prediction mode to generate a plurality of sub-partitions in the CU, for example, as shown in FIGS. 11(a) and 11(b) such that a prediction for a first sub-partition of the plurality of sub-partitions in the CU may be based on a reference sample in a second sub-partition of the plurality of sub-partitions in the CU, as described herein; encoding the CU based on the determined split mode, for example, as described herein; partitioning the CU into the plurality of sub-partitions based on the determined split mode and reconstructing the second sub-partition comprising the reference sample based on a plurality of samples in a reference CU, for example, as shown in FIG. 11(a) and FIG. 11(b); determining, based on the intra-prediction mode, whether the CU is to be encoded based on a first plurality of reference samples that are adjacent to a left boundary of the CU, based on a second plurality of reference samples that are adjacent to a top boundary of the CU, or based on at least one of the first plurality of reference samples and at least one of the second plurality of reference samples, as described herein; selecting a vertical split mode on a condition that the intra-prediction mode indicates that the CU is to be encoded based on a first plurality of reference samples that are adjacent to a left boundary of the CU; selecting a horizontal split mode for the CU on a condition that the intra-prediction mode indicates that the CU is to be encoded based on a second plurality of reference samples that are adjacent to a top boundary of the CU; selecting the split mode based on a determination of whether the first plurality of reference samples are more than the second plurality of reference samples on a condition that the intra-prediction mode indicates that the CU is to be encoded based on a first plurality of reference samples that are adjacent to a left boundary of the CU and based on a second plurality of reference samples that are adjacent to a top boundary of the CU; determining ISP is or is not enabled for the CU; receiving or setting an intra_subpartitions_split_flag for the split mode for ISP; identifying the intra-prediction mode based an intra-prediction mode index and determining a predetermined prediction direction associated with the intra-prediction mode; selecting a wide angle intra-prediction mode for a non-square CU; and other encoder behaviors that are related to any of the above.

A syntax element(s) may be inserted in the signaling, for example, to enable the decoder to identify an indication associated with performing the method as described in FIG. 12, or the method to use. For example, the syntax element may include an ISP indication, indication for an intra-prediction mode, an indication of a parameter that the decoder uses to perform one or more examples herein etc, for example, to indicate to the decoder whether one or more of them are enabled or disabled.

The method as described in FIG. 12 may be selected and/or applied, for example, based on the syntax element(s) to apply at the decoder. For example, the decoder may receive an indication that ISP is enabled for a CU. Based on the indication, the decoder may perform a method as described in FIG. 12 to determine the split mode for the CU.

The encoder may adapt prediction residual based on one or more examples herein. A residual may be obtained, for example, by subtracting a predicted video block from the original image block. For example, the encoder may predict a video block based on the determined split mode. The encoder may obtain the original image block and subtract the predicted video block from the original image block to generate a prediction residual.

A bitstream or signal may include one or more of the described syntax elements, or variations thereof. For example, a bitstream or signal may include a syntax element(s) that indicates any of an ISP, an intra-prediction mode, a parameter that the decoder uses to perform one or more examples herein etc is enabled, activated or not.

A bitstream or signal may include syntax conveying information generated according to one or more examples herein. For example, information or data may be generated in performing the example as shown in FIG. 12. The generated information or data may be conveyed in syntax included in the bitstream or signal.

Syntax elements that enable the decoder to adapt a residual(s) in a manner corresponding to that used by an encoder may be inserted in a signal. For example, the residual may be generated using one or more examples herein.

A method, process, apparatus, medium storing instructions, medium storing data, or signal may be used for creating and/or transmitting and/or receiving and/or decoding a bitstream or signal that includes one or more of the described syntax elements, or variations thereof.

A method, process, apparatus, medium storing instructions, medium storing data, or signal may be used for creating and/or transmitting and/or receiving and/or decoding according to any of the examples described.

A TV, set-top box, cell phone, tablet, or other electronic device may determine a split mode for a CU based on the intra-prediction mode associated with the CU according to any of the examples described.

A TV, set-top box, cell phone, tablet, or other electronic may determine a split mode for a CU based on the intra-prediction mode associated with the CU according to any of the examples described, and that display (e.g. using a monitor, screen, or other type of display) a resulting image.

A TV, set-top box, cell phone, tablet, or other electronic device may select (e.g. using a tuner) a channel to receive a signal including an encoded image, and determine a split mode for a CU based on the intra-prediction mode associated with the CU according to any of the examples described.

A TV, set-top box, cell phone, tablet, or other electronic device that receives (e.g. using an antenna) a signal over the air that includes an encoded image, and determine a split mode for a CU based on the intra-prediction mode associated with the CU according to any of the examples described.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. An apparatus for video decoding, comprising one or more processors, wherein the one or more processors are configured to:
   determine an intra-prediction mode for a coding block;
   infer a split mode based on the intra-prediction mode to generate a plurality of sub-partitions in the coding block, wherein a prediction for a first sub-partition of the plurality of sub-partitions in the coding block is based on a reference sample in a second sub-partition of the plurality of sub-partitions in the coding block, and wherein the split mode is inferred to be a vertical split mode based on a condition that the intra-prediction mode indicates that the coding block is to be decoded based on a plurality of reference samples adjacent to a left boundary of the coding block; and
decode the coding block based on the inferred split mode.

2. The apparatus of claim 1, wherein the one or more processors are further configured to:
   determine an intra-prediction mode for a second coding block; and
   based on a condition that the intra-prediction mode indicates that the second coding block is to be decoded based on a second plurality of reference samples is adjacent to a top boundary of the second coding block, infer a horizontal split mode for the second coding block.

3. The apparatus of claim 1, wherein the one or more processors are further configured to:
   determine an intra-prediction mode for a second coding block; and
   based on a condition that the intra-prediction mode indicates that the second coding block is to be decoded based on a first plurality of reference samples adjacent to a top boundary of the second coding block and based on a second plurality of reference samples adjacent to a left boundary of the second coding block, the infer a split mode for the second coding block based on a determination of whether the first plurality of reference samples is more than the second plurality of reference samples.

4. The apparatus of claim 1, wherein the one or more processors are configured to:
   partition the coding block into the plurality of sub-partitions based on the inferred split mode; and
   reconstruct the second sub-partition comprising the reference sample based on a plurality of samples in a reference coding block.

5. The apparatus of claim 1, wherein an intra sub-partition (ISP) is enabled for the coding block.

6. An apparatus for video encoding, comprising one or more processors, wherein the one or more processors are configured to:
   determine an intra-prediction mode for a coding block;
   determine a split mode based on the intra-prediction mode to generate a plurality of sub-partitions in the coding block, wherein a prediction for a first sub-partition of the plurality of sub-partitions in the coding block is based on a reference sample in a second sub-partition of the plurality of sub-partitions in the coding block, and wherein a vertical split mode is determined based on a condition that the intra-prediction mode indicates that the coding block is to be decoded based on a plurality of reference samples adjacent to a left boundary of the coding block; and
   encode the coding block based on the determined split mode.

7. The apparatus of claim 6, wherein the one or more processors are configured to:
   generate a residual based on the coding block; and
   include the residual in a bitstream without including an indication of the determined split mode in the bitstream.

8. The apparatus of claim 6, wherein the one or more processors are configured to:
   partition the coding block into the plurality of sub-partitions based on the determined split mode; and
   reconstruct the second sub-partition comprising the reference sample based on a plurality of samples in a reference coding block.

9. The apparatus of claim 6, wherein an intra sub-partition (ISP) is enabled for the coding block.

10. A method for video decoding, comprising:
    determining an intra-prediction mode for a coding block;
    inferring a split mode based on the intra-prediction mode to generate a plurality of sub-partitions in the coding block, wherein a prediction for a first sub-partition of the plurality of sub-partitions in the coding block is based on a reference sample in a second sub-partition of the plurality of sub-partitions in the coding block, and wherein a vertical split mode is inferred based on a condition that the intra-prediction mode indicates that the coding block is to be decoded based on a plurality of reference samples adjacent to a left boundary of the coding block; and
    decoding the coding block based on the inferred split mode.

11. The method of claim 10 further comprising:
    determining an intra-prediction mode for a second coding block; and
    based on a condition that the intra-prediction mode indicates that the second coding block is to be decoded based on a second plurality of reference samples adjacent to a top boundary of the second coding block, inferring a horizontal split mode for the second coding block.

12. The method of claim 10, wherein the method further comprises:
    determining an intra-prediction mode for a second coding block; and
    determining, based on the intra-prediction mode, whether the second coding block is to be decoded based on a first plurality of reference samples adjacent to a left boundary of the second coding block, based on a second plurality of reference samples adjacent to a top boundary of the second coding block, or based on at least one of the first plurality of reference samples and at least one of the second plurality of reference samples; and
    inferring a split mode for the second coding block based on the determination of whether the second coding block is to be decoded based on the first plurality of reference samples adjacent to the left boundary of the second coding block, based on the second plurality of reference samples adjacent to the top boundary of the second coding block, or based on at least one of the first plurality of reference samples and at least one of the second plurality of reference samples.

13. The method of claim 10, wherein the method further comprises:
    partitioning the coding block into the plurality of sub-partitions based on the inferred split mode; and
    reconstructing the second sub-partition comprising the reference sample based on a plurality of samples in a reference coding block.

14. A method for video encoding, comprising:
    determining an intra-prediction mode for a coding block;
    determining a split mode based on the intra-prediction mode to generate a plurality of sub-partitions in the coding block, wherein a prediction for a first sub-partition of the plurality of sub-partitions in the coding block is based on a reference sample in a second sub-partition of the plurality of sub-partitions in the coding block, and wherein a vertical split mode is determined based on a condition that the intra-prediction mode indicates that the coding block is to be decoded based on a plurality of reference samples adjacent to a left boundary of the coding block; and encoding the coding block based on the determined split mode.

15. The method of claim 14, wherein the method further comprises bypassing sending an indication of the determined split mode.

16. The method of claim 14, wherein the method further comprises:

partitioning the coding block into the plurality of sub-partitions based on the determined split mode; and reconstructing the second sub-partition comprising the reference sample based on a plurality of samples in a reference coding block.

17. The method of claim 14, wherein an intra sub-partition (ISP) is enabled for the coding block.

18. A non-transitory, computer readable medium comprising computer-executable instructions for causing one or more processors to perform the method of claim 10.

* * * * *